United States Patent [19]

Polsky et al.

[11] 4,090,246
[45] May 16, 1978

[54] SEQUENTIAL COMPUTING SYSTEM

[76] Inventors: Jury Mikhailovich Polsky, ulitsa Postysheva, 16, kv. 26; Valentin Petrovich Zakharov, ulitsa Anri Barbjusa, 22-26, kv. 78; Nikolai Trofimovich Golets, ulitsa Malinovskogo, 25"g", kv. 79; Jury Vasilievich Tayakin, ulitsa Scherbakova, 98"v", kv. 109; Gennady Petrovich Lipovetsky, ulitsa Scherbakova, 82"g", kv. 13; Valery Vasilievich Protsenko, ulitsa Scherbakova, 98"b", kv. 66; Alexandr Dmitrievich Khomenko, ulitsa Vernadskogo, 73, kv. 4"a"; Vladimir Pavlovich Sidorenko, ulitsa Scherbakova, 92"v", kv. 29; Alexandr Yakovlevich Sirota, ulitsa Scherbakova, 74"b", kv. 81; Jury Vladimirovich Prokofiev, ulitsa Scherbakova, 73, kv. 131; Alexandr Maximovich Kopytov, ulitsa Karpinskogo, 3, all of Kiev, U.S.S.R.

[21] Appl. No.: 691,601

[22] Filed: Jun. 1, 1976

[51] Int. Cl.² .............................................. G06F 7/38
[52] U.S. Cl. ................................................... 364/736
[58] Field of Search ................ 235/156, 160, 164, 159

[56] References Cited

U.S. PATENT DOCUMENTS

| | | |
|---|---|---|
| 3,760,171 | 9/1973 | Wang et al. .......................... 235/156 |
| 3,924,110 | 12/1975 | Cochran et al. ...................... 235/156 |
| 3,971,925 | 7/1976 | Wenninger et al. .................. 235/156 |

Primary Examiner—David H. Malzahn
Attorney, Agent, or Firm—Lackenbach, Lilling & Siegel

[57] ABSTRACT

According to the invention, the proposed sequential computing system comprises at least one sequential computer and includes registers connected in series, an auxiliary accumulator register and a Link register, which are connected via gates to an adder, an address counter, a program matrix, a synchroprogram matrix and a microinstruction matrix connected in series via input and output signal commutation devices, an address counter control unit connected to the program matrix, the address counter and the Link register, and a controlled synchronizer connected to the input and output signal commutation devices of the synchroprogram matrix. The outputs of the microinstruction matrix are connected to the control inputs of the gates. The invention makes it possible to use different systems on a single computer to solve simple problems, or on a number of computers to solve complicated mathematical problems and problems of management, as well as to evolve programmable systems.

18 Claims, 12 Drawing Figures

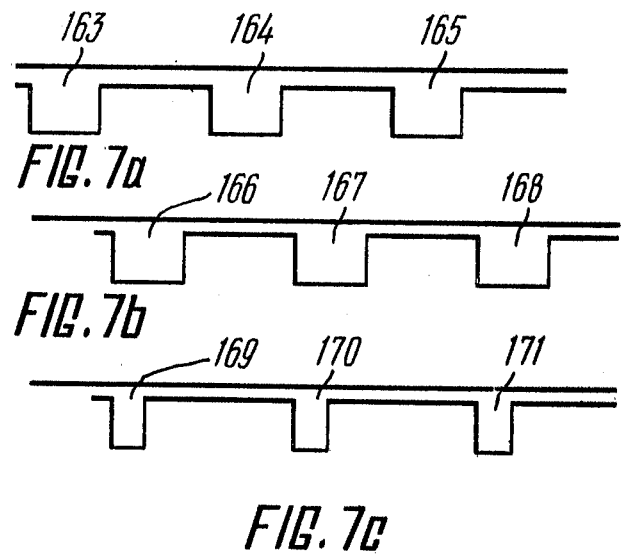
FIG. 7a
FIG. 7b
FIG. 7c
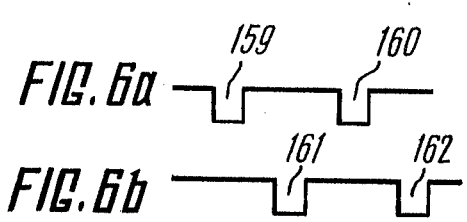
FIG. 6a
FIG. 6b

| T | MK | $z_1$ | $z_2$ | $z_3$ | $z_4$ | | $z_{32}$ | $z_{33}$ | $z_{34}$ | $z_{35}$ | $z_{36}$ |
|---|---|---|---|---|---|---|---|---|---|---|---|
| 1 | 00 | $c_{12}$ | $b_{12}$ | $a_{12}$ | $c_{11}$ | | $b_2$ | $a_2$ | $c_1$ | $b_1$ | $a_1$ |
| 2 | 00 | $a_1$ | $c_{12}$ | $b_{12}$ | $a_{12}$ | ... | $c_2$ | $b_2$ | $a_2$ | $c_1$ | $b_1$ |
| 3 | 00 | $b_1$ | $a_1$ | $c_{12}$ | $b_{12}$ | | $a_3$ | $c_2$ | $b_2$ | $a_2$ | $c_1$ |
| 4 | 00 | $c_1$ | $b_1$ | $a_1$ | $c_{12}$ | | $b_3$ | $a_3$ | $c_2$ | $b_2$ | $a_2$ |
| ⋮ | ⋮ | ⋮ | ⋮ | ⋮ | ⋮ | ⋮ | ⋮ | ⋮ | ⋮ | ⋮ | ⋮ |
| 32 | 00 | $a_{11}$ | $c_{10}$ | $b_{10}$ | $a_{10}$ | | $c_{12}$ | $b_{12}$ | $a_{12}$ | $c_{11}$ | $b_{11}$ |
| 33 | 00 | $b_{11}$ | $a_{11}$ | $c_{10}$ | $b_{10}$ | ... | $a_1$ | $c_{12}$ | $b_{12}$ | $a_{12}$ | $c_{11}$ |
| 34 | 00 | $c_{11}$ | $b_{11}$ | $a_{11}$ | $c_{10}$ | | $b_1$ | $a_1$ | $c_{12}$ | $b_{12}$ | $a_{12}$ |
| 35 | 00 | $a_{12}$ | $c_{11}$ | $b_{11}$ | $a_{11}$ | | $c_1$ | $b_1$ | $a_1$ | $c_{12}$ | $b_{12}$ |
| 36 | 00 | $b_{12}$ | $a_{12}$ | $c_{11}$ | $b_{11}$ | | $a_2$ | $c_1$ | $b_1$ | $a_1$ | $c_{12}$ |
| 37 | | $c_{12}$ | $b_{12}$ | $a_{12}$ | $c_{11}$ | | $b_2$ | $a_2$ | $c_1$ | $b_1$ | $a_1$ |

*FIG. 8*

| T | MK | $z_1$ | $z_2$ | $z_3$ | $z_4$ | | $z_{32}$ | $z_{33}$ | $z_{34}$ | $z_{35}$ | $z_{36}$ |
|---|---|---|---|---|---|---|---|---|---|---|---|
| 1 | 00 | $c_{12}$ | $b_{12}$ | $a_{12}$ | $c_{11}$ | . . . | $b_2$ | $a_2$ | $c_1$ | $b_1$ | $a_1$ |
| 2 | 01 | $a_1$ | $c_{12}$ | $b_{12}$ | $a_{12}$ | . . . | $c_2$ | $b_2$ | $a_2$ | $c_1$ | $b_1$ |
| 3 | 00 | $b_1$ | $b_1$ | $c_{12}$ | $b_{12}$ | . . . | $a_3$ | $c_2$ | $b_2$ | $a_2$ | $c_1$ |
| 4 | 00 | $c_1$ | $b_1$ | $b_1$ | $c_{12}$ | . . . | $b_3$ | $a_3$ | $c_2$ | $b_2$ | $a_2$ |
| 5 | 01 | $a_2$ | $c_1$ | $b_1$ | $b_1$ | . . . | $c_3$ | $b_3$ | $a_3$ | $c_2$ | $b_2$ |
| 6 | 00 | $b_2$ | $b_2$ | $c_1$ | $b_1$ | . . . | $b_4$ | $c_3$ | $b_3$ | $a_3$ | $c_2$ |
| : | : | : | : | : | : | : | : | : | : | : | : |
| 32 | 01 | $a_{11}$ | $c_{10}$ | $b_{10}$ | $a_{10}$ | . . . | $c_{12}$ | $b_{12}$ | $a_{12}$ | $c_{11}$ | $b_{11}$ |
| 33 | 00 | $b_{11}$ | $b_{11}$ | $c_{10}$ | $b_{10}$ | . . . | $b_1$ | $c_{12}$ | $b_{12}$ | $a_{12}$ | $c_{11}$ |
| 34 | 00 | $c_{11}$ | $b_{11}$ | $b_{11}$ | $c_{10}$ | . . . | $b_1$ | $b_1$ | $c_{12}$ | $b_{12}$ | $a_{12}$ |
| 35 | 01 | $a_{12}$ | $c_{11}$ | $b_{11}$ | $b_{11}$ | . . . | $c_1$ | $b_1$ | $b_1$ | $c_{12}$ | $b_{12}$ |
| 36 | 00 | $b_{12}$ | $b_{12}$ | $c_{11}$ | $b_{11}$ | . . . | $b_2$ | $c_1$ | $b_1$ | $b_1$ | $c_{12}$ |
| 37 | | $c_{12}$ | $b_{12}$ | $b_{12}$ | $c_{11}$ | . . . | $b_2$ | $b_2$ | $c_1$ | $b_1$ | $b_1$ |

FIG. 9

SEQUENTIAL COMPUTING SYSTEM

The present invention relates to data processing and, more particularly, to sequential computing systems. The invention is applicable in the designing of computing systems. At present, individual objects are most effectively controlled by systems of minicomputers.

There are known minicomputers to control different objects; it should be noted, however, that such minicomputers are not practicable as far as calculation is concerned.

Calculations are normally done with the aid of calculators. Calculators of the most sophisticated types can operate in conjunction with other computers; they are similar to minicomputers in that they can control peripheral equipment.

There is a growing demand, however, for a computing system composed of a number of computers. Each of these computers must be based on the minicomputer principle and, on the other hand, must be able to operate as a calculator. The major problem in this connection is the unification of computers, whereby it may become possible to minimize the production costs of computers intended for different purposes, which are employed in a computing system. The present invention provides a partial solution to the problem of computer unification.

An increase in the range of functions performed by each computer in such a computing system involves a substantial increase in the cost of equipment. On the other hand, the use of the sequential method of data processing in accordance with the present invention makes it possible to considerably reduce the cost of equipment.

There is known a sequential computing system comprising, for example, one computer.

The known computer comprises first, second, third and fourth shift registers, each having an input and an output. The capacity of the fourth register is four bits.

The output of the first register is connected via a first gate to its input and the input of the second register. The output of the second register is connected via a second gate to the input of the third register and the input of the fourth register. The output of the fourth register is connected via a third gate to the input of the third register.

The computer has an adder with two inputs and an output. One of the inputs of said adder is connected via a fourth gate to the output of the second register; the second input of said adder is connected via a fifth gate to the output of the third register; the output of said adder is connected via a sixth gate to the input of the first register. The computer further includes a seventh gate whose output is connected to the input of the first register, the input of said seventh gate being connected to an input bus. The output of the third register is connected via an eighth gate to the input of the first register.

The computer also includes a microinstruction matrix with an input decoder whose inputs are connected to outputs of an address counter. Outputs of the microinstruction matrix are connected to control inputs of the gates in order to apply control signals to said gates to carry out operations of addition, as well as shift and transfer operations.

The high degree of ordering in the structure of known computing systems, which comprise registers and matrices connected in series, makes it possible to produce computing systems on the basis of LSI circuits.

The known computer under review operates as follows.

The registers store information entered via the seventh gate, whereto there has been applied a control signal from the microinstruction matrix. Circulation of information in the registers is effected by applying control signals to the second and eighth gates.

Addition is performed with the aid of the adder. As control signals are applied to the fourth and fifth gates, there takes place a transfer of the contents of the second and third registers to the adder which adds up the contents of the second and third registers. As a control signal is applied to the sixth gate, the result of the addition is transmitted via the conducting sixth gate to the first register to be stored there.

The transfer of the contents of one register to another is effected through the adder by applying control signals to the fourth and sixth gates.

The transfer of the registers' contents in the opposite direction, i.e. the transfer of the contents of the first register to the second, while preserving the original contents in the first register, is carried out via the conducting first gate.

A shift operation is effected by applying a control signal to the third, fourth and sixth gates. As this takes place, the contents of the third register is transferred to the fourth register with a shift by one decimal digit.

Addition, shift and transfer operations make it possible to carry out any calculations.

The sequence of operations is dependent upon the microprogram. The microprogram is a sequence of microinstructions stored in the microinstruction matrix.

The sequence of microinstructions is set by the microinstruction address counter. Each state of the address counter corresponds to a microinstruction.

Output signals of the address counter are applied to the decoder of the microinstruction matrix. The decoder selects one of the matrix's numerous buses, which bus determines the set of control signals to be applied to the gates to carry out the prescribed microinstruction.

A change in the state of the address counter is followed by carrying out the next microinstruction. Thus there are selected the prescribed microinstructions which make up a specified microprogram.

The computing system under review possesses a limited set of microinstructions, for which reason it cannot be used to control peripheral equipment and technological processes. The connections between individual units of the known computing system do not make it possible to unitize said system.

It is an object of the present invention to provide a sequential computing system comprising at least one computer with an enlarged set of microinstructions, which would be able to solve mathematical problems and problems of controlling peripheral equipment and technological processes and which would have a structure that would make it possible to unitize and reprogram the computing system, and which structure would be ordered so that the computing system can be built around a single LSI crystal.

The foregoing object is attained by providing a sequential computing system, for solving mathematical problems and controlling peripheral equipment and technological processes, comprising at least one sequential computer having an adder to process information, registers connected in series which are the main memory of the computer, a direct output of the last register being connected via a first gate to a first input of the adder, an input of at least one register being connected via second and third gates to an output of the preceding register and to a first output of the adder, a microinstruction matrix to control the gates, which computer comprises, in accordance with the invention, at least one accumulator register for temporary storage of a signal applied thereto from the output of the adder, its input being connected via a fourth gate to the first output of the adder and via a fifth gate, to its own direct output, the direct and inverse outputs of the accumulator register being connected via sixth and seventh gates to the second input of the adder, at least one single-digit Link register to store transfer signals and initiate signals to control branching of the program depending on subproducts of calculations, its input being connected via an eighth gate to its direct output and via a ninth gate, to the second output of the adder, the input of the first register of the series connected memory registers being connected via a tenth gate to the direct output of the last register of the series connected memory connected registers, via an eleventh gate to the direct output of the accumulator register and via a twelfth gate to the output of at least one more register of the series connected memory connected registers, the computer further including a program matrix with a device for commutation of input signals of the program matrix and with a device for commutation of output signals of the program matrix to store and select the program of problems to be solved, a synchroprogram matrix with a device for commutation of input signals of the synchroprogram matrix and an output decoder of the synchroprogram matrix to store and select synchroprograms, each synchroprogram being a sequence of addresses of microinstructions, a controlled synchronizer for double-periodic synchronization of the computer units comprising at least three counters connected in series to initiate time-separated clock signals and at least one control signal forming unit connected to a the outputs of the last in sequence counter of the controlled synchronizer, a device for commutation of input signals of the microinstruction matrix being connected to the output decoder of the synchroprogram matrix, the device for commutation of input signals of said synchroprogram matrix being connected to the device for commutation of output signals of the program matrix, thereby making up a two-level system of data processing control, the device for commutation of input signals of the synchroprogram matrix being connected to one counter of the controlled synchronizer, the output decoder of the synchroprogram matrix being electrically coupled to the control signal forming unit of the controlled synchronizer to set a sequence of microinstructions, the inputs of the device for commutation of input signals of the program matrix being connected to the outputs of an address counter whose first group of inputs is connected to respective outputs of the device for commutation of output signals of the program matrix, and whose second group of inputs is connected to the outputs of an address counter control unit, whose first group of inputs is connected to respective outputs of the device for communication of output signals of the program matrix, and whose second group of inputs has one input connected to an output of a respective counter of the controlled synchronizer and another input connected to the direct output of the single-digit Link register.

It is expedient that in the proposed sequential computing system, at least one computer should include thirteenth gate for carrying out a disjunction operation, said gate being placed between the direct output of the last register and the second input of the adder.

It is desirable that in at least one computer of the proposed sequential computing system, the series connected memory registers and the accumulator register should be four-digit shift registers, all the gates and the adder should be single-channel circuits, and the first counter of the controlled synchronizer should be for determining the time required to process four bits of information.

It is desirable that in at least one computer of the proposed sequential computing system, the accumulator register and the series connected memory registers should be multichannel shift registers, while the adder and all the gates should be multichannel circuits, the control inputs of the multichannel gates being combined and connected to the outputs of the microinstruction matrix.

It is preferable that in at least one computer of the proposed computing system, the electric connection between the output decoder of the synchroprogram matrix and the control signal forming unit of the controlled synchronizer should be effected through a synchroprogram commutation unit, which is used to change the sequence of selecting microinstructions, which is set by the synchronprogram matrix, its first group of inputs being connected to the outputs of the control signal forming unit of the controlled synchronizer, its second group of inputs being connected to respective outputs of the device for communication of output signals of the program matrix, and its outputs being connected to inputs of the output decoder of the synchroprogram matrix.

It is expedient that at least one computer of the proposed sequential computing system should include an address register to produce complex branching of the program, a first group of its inputs being connected to respective outputs of the device for commutation of output signals of the program matrix, a second group of inputs being connected to outputs of the control unit of the address counter, a third group of inputs being connected to control inputs of the computer, and at least one more input being connected to one of the series connected memory registers, the outputs of the address register being connected to respective inputs of the address counter.

It is also expedient that at least one computer of the proposed sequential computing system should include an output matrix with a device for commutation of input signals for the output of information, outputs of said matrix being connected to control output of the computer, a code conversion unit, at least one of its inputs being connected to one of the series connected memory registers, and another of its inputs being connected to one output of the second counter of the controlled synchronizer, its outputs being connected to inputs of the device for commutation of inputs signals of the output matrix whose outputs are connected to inputs of the output matrix.

It is preferable that in at least one computer of the proposed sequential computing system, the additional control inputs of the second, third, tenth, eleventh and twelfth gates at the inputs of the series connected memory registers should be connected to an additional output of the device for commutation of output signals of the program matrix.

It is also preferable that at least one computer of the proposed sequential computing system should include two ok circuits and an AND circuit to form constants required for carrying out operations involving decimal numbers, inputs of the first ok circuit being connected to respective outputs of the first counter of the controlled synchronizer, an output of the first ok circuit being connected via a fourteenth gate to the second input of the adder, the same outputs of the first counter of the controlled synchronizer being connected to respective inputs of the second ok circuit whose output is connected to a first input of the AND circuit whose second input is connected to the inverse output of the single-digit Link register, an output of the AND circuit being connected via a fifteenth gate to the first input of the adder, which is connected via a sixteenth gate to the inverse output of the last register of the series connected memory registers, the third input of the adder being connected via a seventeenth gate to the direct output of the single-digit Link register.

It is expedient that at least one computer of the proposed sequential computing system should include a flip-flop to enter digital information from peripheral devices into the computer, an input of said flip-flop being connected to an output of a multiple-input gate whose group of inputs is connected to respective inputs of the address register, and whose additional input is connected to a respective output of the address counter control unit, an output of said flip-flop being connected to a respective input of the address counter control unit and, via an eighteenth gate, to the third input of the adder.

It is also expedient that in order to synchronize the units of the computing system, at least one computer of said system should be provided with a synchronization input and a synchronization output respectively connected to the input of the first counter and the output of the last counter of the controlled synchronizer, a respective output of the first counter being connected via a nineteenth gate to the third input of the adder.

It is preferable that at least one computer of the proposed sequential computing system should have a twentieth gate to connect the direct output of the accumulator register to the separated output of the computer, and additional series connected register to expand the main memory of the computer, the output of the last register of the additional series connected registers being connected via a twenty-first gate to the separated output of the computer and via a twenty-second gate to the first input of the adder, the input of the first register of the additional series connected registers being connected to the separated input of the computer.

It is expedient that the computing system should comprise a prescribed number of sequential computers, each of which being similar to the above-described computer, connected so that the separated input of each preceding computer is connected to the separated output of the following computer, whereas the separated input of the last computer is connected to the separated output of the first computer whose synchronization output is connected to synchronization inputs of all the following computers.

It is expedient that the computing system comprising three sequential computers should include at least one external shift register comprising an output buffer device to connect the external shift register to a respective computer, an input of the external shift register being connected to a seperated output of the first computer, whereas the output buffer device is connected to the separate input of the last computer.

It is also expedient that in the proposed computing system, the output buffer device of the external shift register should include two followers, each comprising a first FET transistor whose drain is connected to a first clock pulse bus, its gate being connected to an input of the follower, whereas its source is connected to an output of the follower and the drain of a second FET transistor whose gate is connected to a second clock pulse bus, its source being connected to a common bus, there being placed between the gate and source of the first FET transistor a positive feedback capacitor, the input of the first follower being connected to an output of an inverter whose input is connected to an input of the buffer device and the drain of a third FET transistor whose gate is connected to the second clock pulse bus, the output of the first follower being connected to the gate of a fourth FET transistor whose drain is connected to a first supply bus, its source being combined into a common point with the drain of a fifth FET transistor, whose source is connected to the common bus, and whose gate is connected to the output of the second follower, and the gate of a sixth FET transistor, whose source is connected to the common bus, and whose drain is combined into a common point with the source of a seventh FET transistor whose drain is connected to the first supply bus, and whose gate is combined with the source of the third FET transistor and the input of the second follower, there being connected to the common point, formed by the source of the seventh FET transistor and the drain of the sixth FET transistor, the gate of an eighth FET transistor whose drain is connected to a second supply bus, and whose source is combined with the output of the buffer device and the drain of a ninth FET transistor, whose source is connected to the common bus, and whose gate is connected to the common point formed by the source of the fourth FET transistor, the drain of the fifth FET transistor and the gate of the sixth FET transistor.

It is also expedient that in at least one computer of the proposed sequential computing system, the instruction address counter should be a system of flip-flops connected in series via gates, in which system the output of the penultimate flip-flop is connected via an inverter and a gate to the input of the first flip-flop.

It is preferable that in the proposed computing system, the device for commutation of input signals of the matrices should include a decoder to provide for conduction between the common input and one of the outputs of the decoder, depending upon which code has been applied to the address inputs of the decoder, first and second exciting circuits of the decoder, an output of each of said circuits being connected to a respective address input of the decoder, a discharge device whose inputs are connected to outputs of the decoder and inputs of a respective matrix, and an inverter whose output is connected to the common input of the decoder, and whose input is connected to a first clock pulse bus. Each of the first exciting circuits of the decoder includes a first FET transistor whose drain is connected to an address signal bus, whose gate is connected to a second clock pulse bus, and whose source is connected to the gate of a second FET transistor whose source is connected to a third clock pulse bus, and whose drain is connected to an output of said first exciting circuit of the decoder, there being placed between the drain and gate of the second FET transistor a positive feedback capacitor. Each of the second exciting circuits of the decoder includes a third FET transistor whose source is connected to the second clock pulse bus, whose gate is connected to the address signal bus, while its drain is connected to the source of a fourth FET transistor, whose gate and drain are connected to the second clock pulse bus, and the gate of a fifth FET transistor whose drain is connected to an output of said second exciting circuit, and whose source is connected to the third clock pulse bus, there being placed between the source and gate of the fifth FET transistor a switchable capacitor whose control electrode is connected to the gate of the fifth FET transistor, and whose other electrode is connected to the source of the same transistor. The discharge device comprising FET transistors whose drains are connected to inputs of the discharge device, whose gates are connected to the first clock pulse bus, and whose sources are connected to the common bus.

It is also preferable that in at least one computer of the proposed sequential computing system, the device for commutation of output signals of the program matrix should comprise a decoder to provide for conduction between its inputs and outputs, depending upon which code has been applied to the address inputs of the decoder, first and second exciting circuits of the decoder, an output of each of said circuits being connected to a respective address input of the decoder, and a charger whose outputs are connected to the inputs of the decoder and outputs of the program matrix. Each of the first exciting circuits of the decoder includes a first FET transistor whose drain is connected to an address signal bus, whose gate is connected to the second clock pulse bus, and whose its source is connected to the gate of a second FET transistor whose source is connected to the third clock pulse bus, and whose drain is connected to an output of said first exciting circuit, there being placed between the drain and gate of the second FET transistor a positive feedback capacitor. Each of the second exciting circuits of the decoder includes a third FET transistor whose source is connected to the second clock pulse bus, whose gate is connected to the address signal bus, and whose drain is connected to the source of a fourth FET transistor, whose gate and drain are connected to the second clock pulse bus, and the gate of a fifth FET transistor whose drain is connected to an output of said second exciting circuit, and whose source is connected to the third clock pulse bus, between the source and gate of the fifth FET transistor there being placed switchable capacitor whose control electrode is connected to the gate of the fifth FET transistor, and whose other electrode is connected to the source of the same transistor. The charger comprising FET transistors whose sources are connected to outputs of the charger, whose gates are connected to the first clock pulse bus, and whose drains are connected to the supply bus.

It is also preferable that each computer of the proposed sequential computing system should be built around a single semiconductor substrate.

The present invention substantially reduces the designing and manufacturing costs of computing systems, for computer incorporated into each system are of the same structure and differ only in the way their matrices are threaded (which provides for reprogramming of a computer); the threading of matrices is altered by replacing only one masking element when manufacturing an LSI circuit. A masking element is a mask with holes whose location is determined by the computer's software.

The proposed sequential computing system performs the functions of a minicomputer, so it can be used to control peripheral equipment and technological processes, as well as to solve mathematical problems.

Other objects and advantages of the present invention will become more apparent from the following detailed description of preferred embodiments thereof taken in conjunction with the accompanying drawings, wherein:

FIGS. 6a and 6b are voltage time plots of clock pulses, illustrating operation of the output buffer device of the external register of a sequential computer, in accordance with the invention;

FIGS. 7a, 7b and 7c are voltage time plots of clock pulses, illustrating operation of the devices for communtation of input and output signals of the matrices, in accordance with the invention;

FIG. 8 is a table of alterations of information in the series connected memory registers $2_1, \ldots, 2_{36}$ when carrying out circulation microinstructions, in accordance with the invention; and FIG. 9 is a table of alterations of information in the series connected memory registers $2_1, \ldots, 2_{36}$ when carrying out the operation of replacing the word $a$ by the word $b$, in accordance with the invention.

Figure 1:
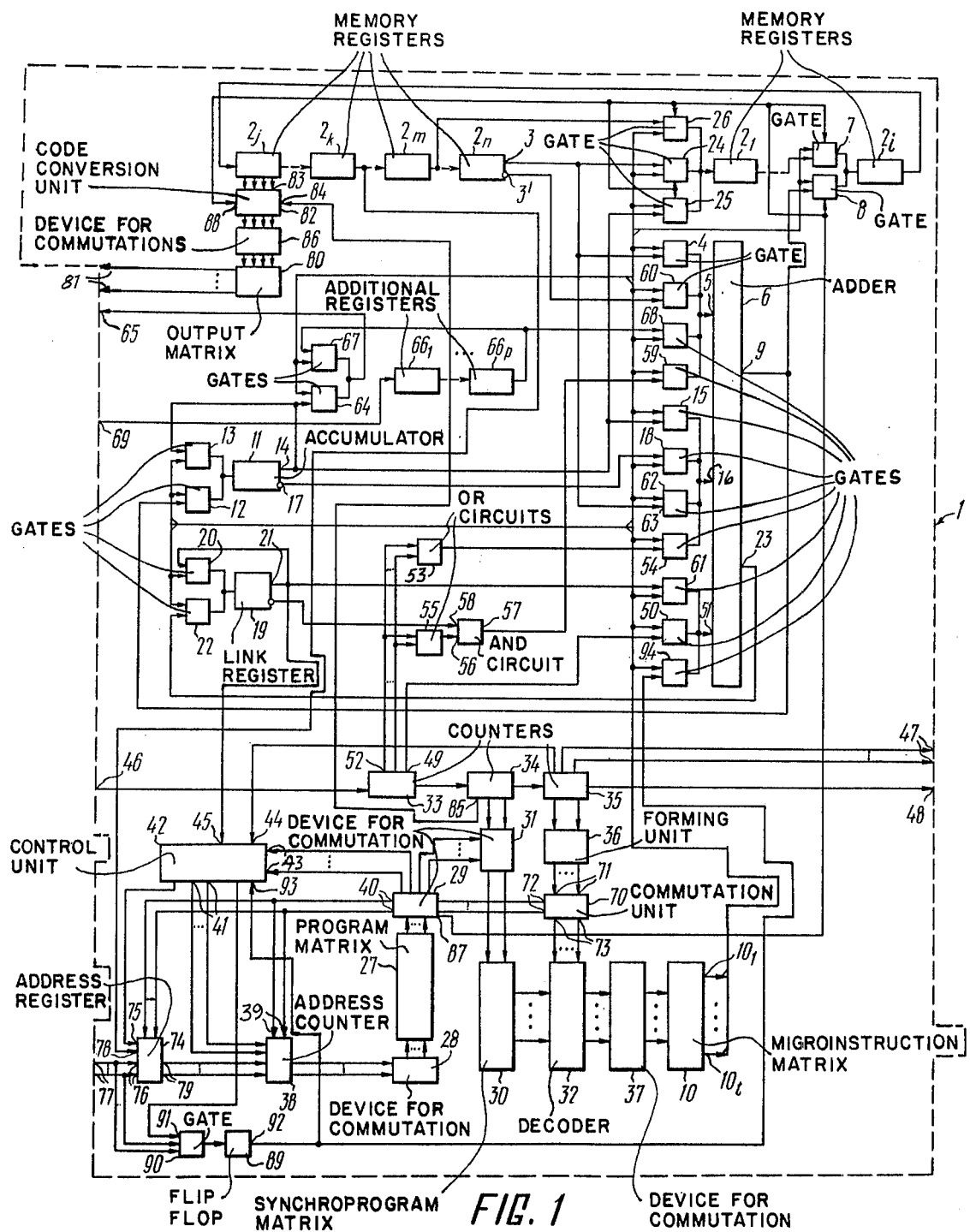
FIG. 1 is a block diagram of a sequential computing system comprising one sequential computer, in accordance with the invention.

Consider now the embodiment wherein a sequential computing system for solving mathematical problems and controlling peripheral equipment and technological processes comprises a sequential computer 1 (FIG. 1). The computer 1 has registers $2_1, \ldots, 2_i, \ldots, 2_m, \ldots, 2_n$ connected in series.

A direct output 3 of the last register $2_n$ is connected via a gate 4 to a first input 5 of an adder 6.

An input of the register $2_i$ is connected via respective gates 7 and 8 to an output of the preceding register $2_{i-1}$ (not shown) and a first output 9 of the adder 6.

The sequential computer 1 also includes a microinstruction matrix 10 having outputs $10_1, \ldots, 10_l$.

According to the invention, the computer 1 further comprises an accumulator register 11 whose input is connected via a gate 12 to the output 9 of the adder 6 and via a gate 13 to its own direct output 14.

The direct output 14 of the accumulator register 11 is connected via a gate 15 to a second input 16 of the adder 6. An inverse output 17 of the accumulator register 11 is connected via a gate 18 to the second input 16 of the adder 6.

The computer 1 further comprises a single-digit Link register 19 whose input is connected via a gate 20 to its direct output 21 and via a gate 22 to a second output 23 of the adder 6.

An input of the register $2_1$ is connected via gates 24, 25 and 26 to the direct output 3 of the last register $2_n$, the direct output 14 of the accumulator register 11 and an output of the register $2_m$, respectively.

The computer 1 includes a program matrix 27 with devices 28 and 29 for commutation of input and output signals, respectively, a synchroprogram matrix 30 with a device 31 for commutation of input signals and an output decoder 32, and a controlled synchronizer.

The controlled synchronizer comprises three counters 33, 34 and 35 connected in series and a control signal forming unit 36 connected to the counter 35.

A device 37 for commutation of input signals of the microinstruction matrix 10 is connected to the output decoder 32 of the synchroprogram matrix 30.

The device 31 for commutation of input signals of the matrix 30 is connected to the device 29 for commutation of output signals of the program matrix 27.

The device 31 for commutation of input signals is connected to the counter 34. The output decoder 32 is electrically coupled to the control signal forming unit 36 of the controlled synchronizer. Inputs of the device 28 for commutation of input signals of the program matrix 27 are connected to outputs of an address counter 38 whose inputs 39 are connected to outputs 40 of the device 29 for commutation of output signals of the program matrix 27, the other inputs of the counter 38 being connected to outputs 41 of an address counter control unit 42.

Inputs 43 of the unit 42 are connected to respective outputs of the device 29 for commutation of output signals of the program matrix 27. Inputs 44 of the unit 42 are connected to respective outputs of the counter 35 of the controlled synchronizer; its input 45 is connected to the output 21 of the single-digit Link register 19.

The input of the first counter 33 is connected to the synchronization input 46 of the computer 1. Outputs of the counter 35 are connected to the synchronization outputs 47 and 48 of the computer 1.

An output 49 of the counter 33 is connected via a gate 50 to a third input 51 of the adder 6.

Other outputs 52 of the counter 33 are connected to inputs of a or circuit 53 whose output is connected via a gate 54 to the second input 16 of the adder 6.

The same outputs 52 of the counter 33 are connected to inputs of another or circuit 55 whose output is connected to an input 56 of an AND circuit 57. Another input 58 of said AND circuit 57 is connected to the inverse output of the single-digit Link register 19. An output of the AND circuit 57 is connected via a gate 59 to the first input 5 of the adder 6.

The first input 5 of the adder 6 is also connected via a gate 60 to an inverse output 3' of the register $2_n$.

The third input 51 of the adder 6 is connected via a gate 61 to the direct output 21 of the single-digit Link register 19.

According to the invention, the computer 1 has a gate 62 whose input 63 is connected to the direct output 3 of the register $2_n$ and whose output is connected to the second input 16 of the adder 6.

According to the invention, the computer 1 includes a gate 64, which connects the direct output 14 of the accumulator register 11 to an output 65 of the computer 1, and additional registers $66_1, \ldots, 66_p$ connected in series. An output of the register $66_p$ is connected via a gate 67 to the same output 65 of the computer 1 and via a gate 68 to the first input 5 of the adder 6.

An input of the register $66_1$ is connected to an input 69 of the computer 1.

According to the invention, in the embodiment of the computer 1 under review, all the registers $2_1, \ldots, 2_i, 2_j, 2_k, \ldots, 2_n$, as well as 11 and $66_1, \ldots, 66_p$, are four-digit registers; the adder 6 and all the gates 4, 7, 8, 12, 13, 15, 18, 20, 22, 24, 25, 26, 50, 54, 59, 60, 61, 62, 64, 67 and 68 are single-channel.

According to an alternative embodiment of the computer 1, all the registers $2_1, \ldots, 2_n$, 11 and $66_1, \ldots, 66_p$, the adder 6 and all the gates 4, 12, 13, 20, 22, 64, 67, 24, 25, 26, 60, 68, 59, 15, 18, 54, 61, 50, 62 and 8 may be multichannel. The control inputs of each multichannel gate are combined and connected to the outputs of the microinstruction matrix.

According to the invention, the computer 1 includes a synchroprogram commutation unit 70 whose inputs 71 are directly connected to the outputs of the control signal forming unit 36 of the controlled synchronizer. Inputs 72 of the unit 70 are connected to respective outputs of the device 29 for commutation of output signals of the program matrix 27. Outputs 73 of the unit 70 are connected to inputs of the output decoder 32 of the synchroprogram matrix 30.

According to the invention, the computer 1 has an address register 74 whose group of inputs 75 is connected to respective outputs of the address counter control unit 42; its other group of inputs is connected to the outputs 40 of the device 29 for commutation of output signals of the program matrix 27; a group of inputs 76 is connected to control inputs 77 of the computer 1; an input 78 is connected to an output of the register $2_k$. Outputs 79 of the address register 74 are connected to respective inputs of the address counter 38.

According to the invention, the computer 1 comprises an output matrix 80 whose outputs are connected to control outputs 81 of the computer 1. The computer 1 still further comprises a code conversion unit 82 whose inputs 83 are connected to outputs of the register $2_j$. An input 84 of the unit 82 is connected to an output 85 of the counter 34 of the controlled synchronizer. Outputs of the unit 82 are connected to inputs of a device 86 for commutation of input signals, whose outputs are connected to inputs of the output matrix 80.

According to the invention, the control inputs of the gates 7, 8, 24, 25 and 26 are connected to outputs 87 of the device 29 for commutation of output signals of the program matrix 27, which inputs 87 are also connected to an input 88 of the code conversion unit 82.

According to the invention, the computer 1 includes a flip-flop 89 whose input is connected to a multiple-input gate 90 whose group of inputs is connected to the inputs 76 of the address register 74; an input 91 of said gate 90 is connected to the output of the address counter control unit 42.

An output 92 of the flip-flop 89 is connected to an input 93 of the address counter control unit 42 and via a gate 94 to the third input 51 of the adder 6.

Figure 2:
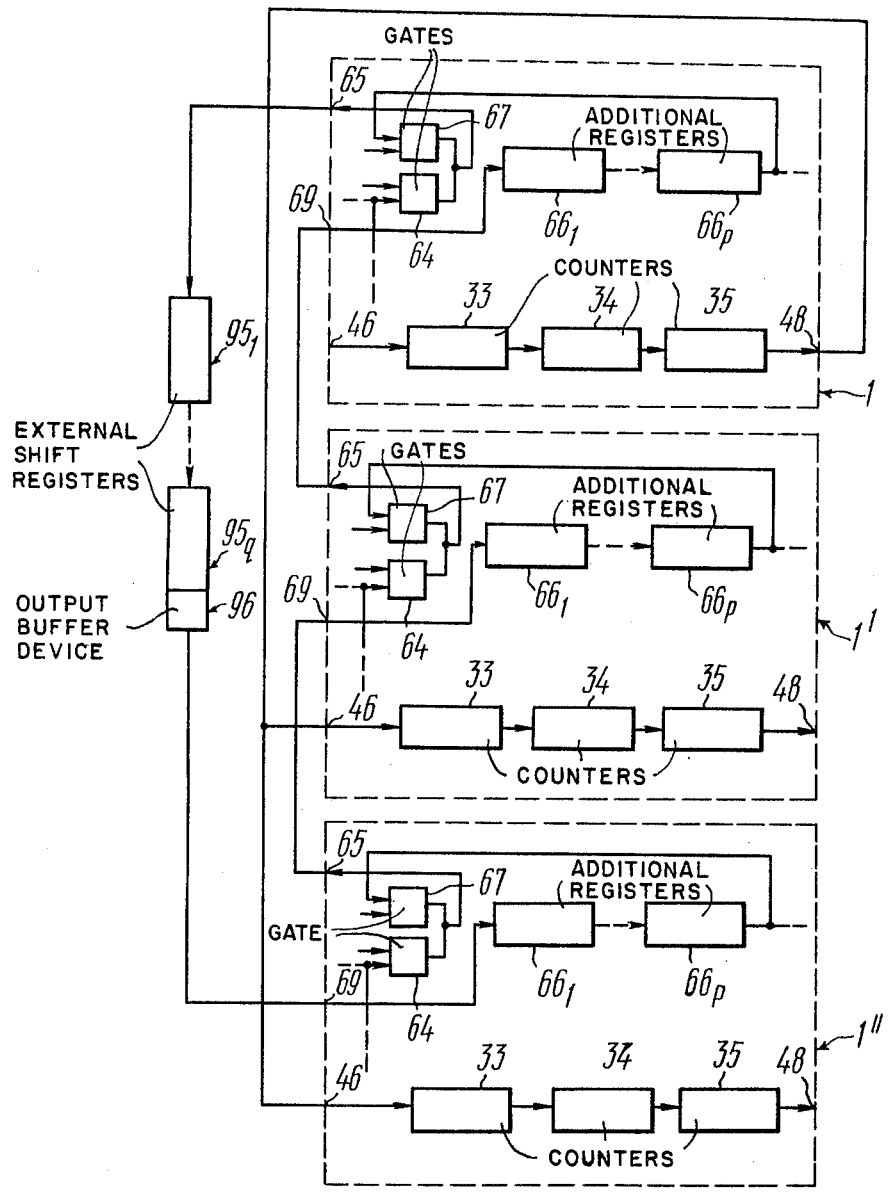
FIG. 2 is a block diagram of a sequential computing system comprising three sequential computers and external registers, in accordance with the invention.

FIG. 2 shows an embodiment of a computing system which comprises, according to the invention, three sequential computers 1, 1' and 1", each constructed as shown in FIG. 1.

The three computers 1, 1' and 1" are connected so that the input 69 of the first computer 1 is connected to the output 65 of the second computer 1' whose separated input 69 is connected to the output 65 of the third computer 1" whose input 69 is connected to the output 65 of the first computer 1, whereas the synchronization inputs 46 of the second and third computers 1' and 1" are connected to the synchronization output 48 of the first computer 1.

According to the invention, this computing system includes external shift registers $95_1, \ldots, 95_q$, an input of the shift register $95_1$ being connected to the output 65 of the computer 1; an output buffer device 96 of the external shift register $95_q$ is connected to the input 69 of the last computer 1".

The synchronization inputs 46 of the second and third computers 1' and 1" are connected to the external synchronization output 48 of the first computer 1.

Figure 3:
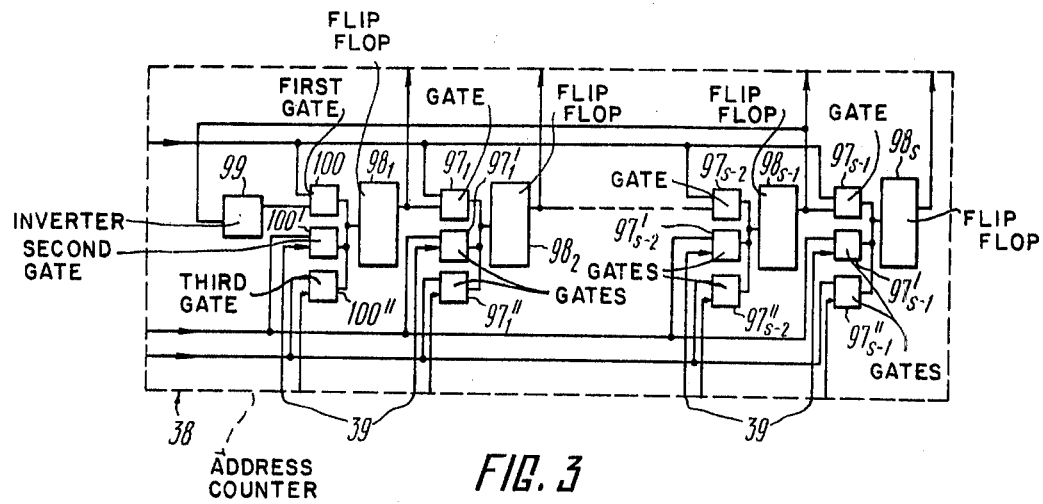
FIG. 3 is a block diagram of an instruction address counter of a sequential computer, in accordance with the invention.

The address counter 38 (FIG. 3) comprises a system of flip-flops $98_1, \ldots, 98_s$ connected in series via gates $97_1, \ldots, 97_{s-1}$. An output of the flip-flop $98_{s-1}$ is connected via an inverter 99 and a gate 100 to an input of the first flip-flop $98_1$.

Control inputs of the gates $97_1, \ldots, 97_{s-1}$ and 100 are combined and connected to one of the inputs of the counter 38, which input is connected to the output 41 (FIG. 1) of the counter control unit 42. The flip-flops $98_1, \ldots, 98_s$ (FIG. 3) are connected via gates 100' and $97'_1, \ldots, 97'_{s-1}$ to the respective inputs 39 of said counter 38. Control inputs of the gates 100' and $97'_1, \ldots, 97'_{s-1}$ are combined and connected to another input of the counter 38, which input is connected to the output 41 (FIG. 1) of the counter control unit 42.

The flip-flops $98_1, \ldots, 98_s$ (FIG. 3) are connected via gates 100" and $97''_1, \ldots, 97''_{s-1}$ to respective inputs of the counter 38, which inputs are connected to the outputs 79 (FIG. 1) of the address register 74.

Control inputs of the gates 100" and $97''_1, \ldots, 97''_{s-1}$ (FIG. 3) are combined and connected to the third input of the counter 38, which input is connected to the output 41 (FIG. 1) of the counter control unit 42.

According to the invention, the computing system includes the output buffer device 96 (FIG. 2).

The output buffer device 96 (FIG. 4) comprises identical followers 101 and 102. Consider now the follower 101. It comprises a first FET transistor 103 whose drain is connected to a first clock pulse bus 104, whose gate is connected to an input 105 of the follower 101, and whose source is connected to an output 106 of the follower 101 and the drain of a second FET transistor 107. The gate of the second FET transistor 107 is connected to a second clock pulse bus 108 and its source is connected to a common bus 109. Between the gate and source of the first FET transistor 103, there is placed a positive feedback capacitor 110. The input 105 of the first follower 101 is connected to an output of an inverter 111 whose input is connected to an input 112 of the buffer device 96 and the drain of a third FET transistor 113. The gate of the third FET transistor 113 is connected to the second clock pulse bus 108. The output 106 of the first follower 101 is connected to the gate of a fourth FET transistor 114 whose drain is connected to a first supply bus 115 and whose source is combined into a common point 116 with the drain of a fifth FET transistor 117. The source of the fifth FET transistor 117 is connected to the common bus 109 and its gate is connected to an output 118 of the second follower 102. To the common point 116, there is also connected the gate of a sixth FET transistor 119 whose source is connected to the common bus 109 and whose drain is combined into a common point 120 with the source of a seventh FET transistor 121. The drain of the seventh FET transistor 121 is connected to the first supply bus 115 and its gate is combined with the source of the third FET transistor 113 and an input 122 of the second follower 102. To the common point 120, there is connected the gate of an eighth FET transistor 123 whose drain is connected to a second supply bus 124 and whose source is combined with an output 125 of the buffer device 96 and the drain of a ninth FET transistor 126 whose source is connected to the common bus 109 and whose gate is connected to the common point 116.

According to the invention, the computer 1 (FIG. 1) includes the devices 28, 31, 37 and 86 for commutation of input signals of the matrices 27, 30, 10 and 80.

Figure 5:
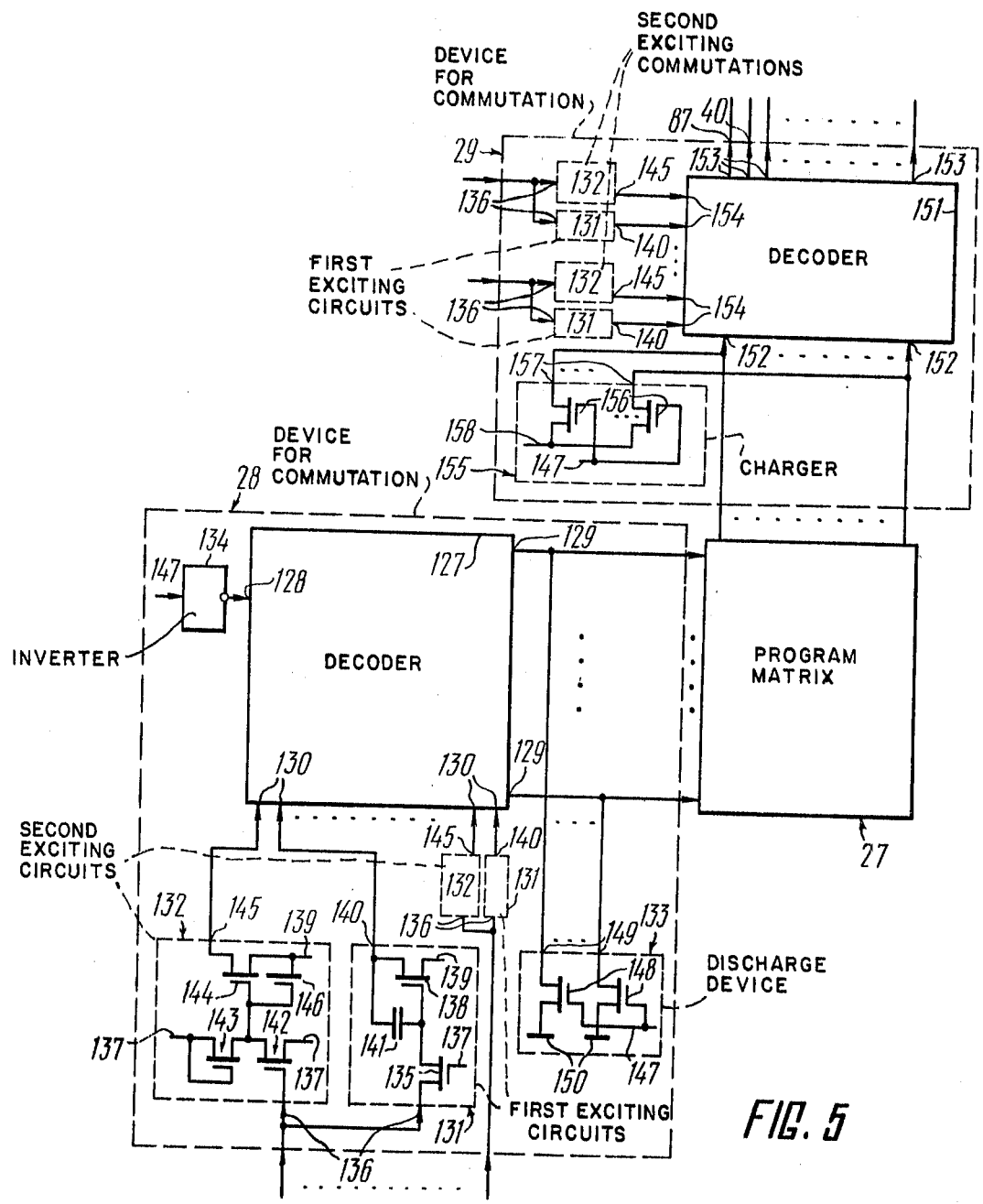
FIG. 5 is an electrical diagram of a device for commutation of input and output signals of program, synchroprogram, microinstruction and output matrices of a sequential computer, in accordance with the invention.

The commutation device, for example, the device 28 (FIG. 5) for commutation of input signals of the matrix 27, comprises a decoder 127 which ensures conduction between a common input 128 and one of the outputs 129 of the decoder 127, depending upon which code has been applied to address inputs 130 of the decoder 127. The commutation device 28 also comprises first exciting circuits 131 and second exciting circuits 132 of the decoder 127, a discharge device 133 and an inverter 134.

Each of the first exciting circuits 131 of the decoder 127 comprises a first FET transistor 135 whose drain is connected to an address signal bus 136, whose gate is connected to a second clock pulse bus 137, and whose source is connected to the gate of a second FET transistor 138. The source of the second FET transistor 138 is connected to a third clock pulse bus 139 and its drain is connected to an output 140 of the exciting circuit 131 of the decoder 127. Between the drain and gate of the second FET transistor 138 there is placed a positive feedback capacitor 141. Each of the outputs 140 of the first exciting circuits 131 of the decoder 127 is connected to the respective address inputs 130 of the decoder 127. Each of the second exciting circuits 132 of the decoder 127 comprises a third FET transistor 142 whose source is connected to the second clock pulse bus 137, whose gate is connected to the address signal bus 136, and whose drain is connected to the source of a fourth FET transistor 143. The drain and gate of the fourth FET transistor 143 are connected to the second clock pulse bus 137. The drain of the third FET transistor 142 is also connected to the gate of a fifth FET transistor 144 whose drain is connected to an output 145 of the exciting circuit 132, and whose source is connected to the third clock pulse bus 139. Between the source and gate of the fifth FET transistor 144, there is placed a switchable capacitor 146 whose control electrode is connected to the gate of the fifth FET transistor 144, and whose other electrode is connected to the source of the same transistor. Each of the outputs 145 of the second exciting circuits 132 of the decoder 127 is connected to the respective inputs 130 of the decoder 127.

An output of the inverter 134 is connected to the common input 128 of the decoder 127; an input of said inverter 134 is connected to a first clock pulse bus 147.

The discharge device 133 comprises FET transistors 148 whose drains are connected to inputs 149 of the discharge device 133, whose gates are connected to the first clock pulse bus 147, and whose sources are connected to a common bus 150. The inputs 149 of the discharge device 133 are connected to the outputs 129 of the decoder 127 and the inputs of the matrix 27.

The device 29 for commutation of output signals of the matrix 27 comprises a decoder 151, which ensures conduction between inputs 152 and outputs 153 of the decoder 151, depending upon which code has been applied to address inputs 154 of the decoder 151, as well as the first and second exciting circuits 131 and 132 of the decoder 151 and a charger 155.

Each of the outputs 140 of the first exciting circuits 131 of the decoder 151 is connected to the respective address input 154 of the coder 151. Each of the outputs 145 of the second exciting circuits 132 of the decoder 151 is connected to the respective address input 154 of the decoder 151.

The charger 155 comprises FET transistors 156 whose sources are connected to outputs 157 of the charger 155, whose gates are connected to the first clock pulse bus 147, and whose drains are connected to a supply bus 158. The outputs 157 of the charger 155 are connected to the inputs 152 of the decoder 151 and the outputs of the matrix 27. The outputs 153 of the decoder 151 are connected to those of the device 29 for commutation of output signals of the matrix 27.

FIGS. 6a and 6b show voltage time plots of clock pulses, which illustrate operation of the output buffer device 96.

FIG. 6a shows a first clock pulse 159 and a second clock pulse 160.

FIG. 6b shows a third clock pulse 161 and a fourth clock pulse 162.

FIGS. 7a, 7b and 7c show voltage time plots of clock pulses, which illustrate operation of the devices for commutation of input and output signals of the matrices.

FIG. 7a shows clock pulses 163, 164 and 165.
FIG. 7b shows clock pulses 166, 167 and 168.
FIG. 7c shows clock pulses 169, 170 and 171.

Consider now operation of the sequential computing system comprising at least one sequential computer 1 (FIG. 1). First of all, it must be noted that the computer 1 comprises "$n$" $\nu$-digit registers $2_1, \ldots, 2_n$, which are placed in series, the accumulator register 11 having $\nu$ digits, the adder 6, and the counters 33, 34 and 35 of the controlled synchronizer, whose division factors are $\nu$, $\mu$ and $\lambda$.

Clock generator signals are simultaneously applied to the input of the counter 33 of the controlled synchronizer and the control inputs of the registers $2_1, \ldots, 2_n$ (the clock generator and control inputs of the registers $2_1, \ldots, 2_n$ are not shown in FIG. 1).

From the output of the counter 33, the signals are applied to the counter 34 from whose output they are applied to the inputs of the counter 35.

The common division factor "$k$" of the counters 33, 34 and 35 of the controlled synchronizer is: $k = \nu \cdot \mu \cdot \lambda$; the common number M of the digits of the series connected memory registers $2_1, \ldots, 2_n$ is: $M = \nu \cdot n$.

In the computing system under review, the period of circulation of information in the registers $2_1, \ldots, 2_n$, as control signals are applied from the outputs $10_1, \ldots, 10_t$ of the matrix 10 to the gates 24 and 7, is equal to the repetition period of output signals of the counter 35 of the controlled synchronizer, i.e. $k = M$. This makes it possible to unambiguously establish the information layout in the registers $2_1, \ldots, 2_n$ at any moment of time in order to convert said information.

Information in the registers $2_1, \ldots, 2_n$ is converted with the aid of control signals applied from the outputs $10_1, \ldots, 10_t$ of the matrix 10 at moments of time when information to be converted is passing through the gates 4, 7, 8, 24, 25 and 60.

The combination of the control signals applied from the outputs $10_1, \ldots, 10_t$ of the microinstruction matrix 10 at a specified moment of time is a microinstruction of the computer 1. Each microinstruction lasts for a period of time required to process $\nu$ bits of information. The microinstruction matrix 10 has a set of microinstructions sufficient to solve a certain range of problems, for example, mathematical problems.

The necessary microinstruction is selected with the aid of the device 37 for commutation of input signals of the microinstruction matrix 10.

For this purpose, codes of the address of the required mircroinstruction are applied from the output decoder 32 of the synchroprogram matrix 30 to the inputs of the device 37 for commutation of input signals of the microinstruction matrix 10.

A synchroprogram is a sequence of n microinstructions carried out within a time interval equal to one operating cycle of the computer 1. The operating cycle of the computer 1 is equal to the period of circulation of information in the registers $2_1, \ldots, 2_n$.

The moments for selecting a required microinstruction are set by the control signal forming unit 36 of the controlled synchronizer. Thus, a synchroprogram determines both the sequence of microinstructions carried out during one operating cycle of the computer 1 and the moments for selecting these microinstructions within one operating cycle of the computer 1.

The synchroprogram matrix 30 has a set of synchroprograms sufficient to solve a given range of problems.

A necessary synchroprogram is selected with the aid of the device 29 for commutation of output signals of the program matrix 27 and the device 31 for commutation of input signals of the synchroprogram matrix 30. For this purpose, a respective code of the address of a synchroprogram is applied from the device 29 for commutation of input signals of the program matrix 27 to the inputs of the device 31 for commutation of input signals of the synchroprogram matrix 30. The address code of a synchroprogram is set for a period of time equal to one operating cycle of the computer 1.

A program for solving a specified range of problems is a sequence of instructions of the computer 1 which ensure control over the problem solving process. A set of such programs is contained in the program matrix 27. An instruction contains a synchroprogram address code, a new instruction address code, a code of a condition of a jump to a new instruction, a synchroprogram modification code, and a microinstruction modification code.

An instruction required for calculation is selected with the aid of the device 28 for commutation of input signals of the program matrix 27.

For this purpose, a respective instruction address code is applied from the output of the address counter 38 to the inputs of the device 28 for commutation of input signals of the program matrix 27. The instruction address code is set in the address counter 38 for a period of time required to carry out the instruction, which period is equal to one operating cycle of the computer 1. A change in the state of the code of the address counter 38 is effected by signals arriving from the output 41 of the address counter control unit 42, which signals correspond to a code of the condition of a jump to a new instruction.

An address of new instructions is entered into the counter 38 when a control signal is applied from the outputs 41 of the unit 42 to the control inputs of the gates 100′ and 97′$_1$, ..., 97′$_{s-1}$ (FIG. 3) and/or the inputs of the gates 100″ and 97″$_1$, ..., 97″$_{s-1}$ (FIG. 3), when signals from the outputs 40 of the device 29 are applied to the inputs 39 of the counter 38, and/or when a signal from the outputs 79 of the address register 74 is applied to the respective inputs of the counter 38.

The address of the next instruction is entered into the counter 38 when a signal from the respective output 41 of the unit 42 is applied to the control inputs of the gates 100 and 97$_1$, ..., 97$_{s-1}$. As this takes place, the contents of the first digit of the counter 38 is transferred to the second digit, the contents of the second digit is transferred to the third digit, etc. The contents of the $s-1$ digit is transferred through the inverter 99 and gate 100 to the first digit, so that the address code of the next instruction is fixed in the counter 38.

The code state of the counter 38 is changed at a moment of time set by the counter 35 of the controlled synchronizer.

For this purpose, a signal from the output of the counter 35 of the controlled synchronizer is applied to the input 44 of the address counter control unit 42.

The signal, which corresponds to the code of a condition of a jump to a new instruction, is applied to the input 43 of the address counter control unit 42 from the output of the device 29 for commutation of output signals of the program matrix 27. This ensures at least the following types of jumps to a new instruction and transmission of an instruction address code:

an unconditional jump to carrying out a new instruction whose address code is indicated in the given instruction;

a jump to carrying out a new instruction whose address code is indicated in the given instruction, as a "1" signal is applied from the output 21 of the Link register 19 to the input 45 of the counter control unit 42, or a jump to carrying out the next instruction as a "0" signal is applied from the output 21 of the Link register 19;

a jump to carrying out a new instruction whose address code is indicated in the given instruction, as a "0" signal is applied from the output 21 of the Link register 19 to the input 45 of the counter control unit 42, or a jump to carrying out the next instruction, as a "1" signal arrives from the output 21 of the Link register 19;

a jump to carrying out a new instruction whose address code is formed by way of disjunction (conjunction) of the code of the address counter 74 and of the address code indicated in the given instruction; signals, corresponding to the address code indicated in the given instruction, are applied to the inputs 39 of the address counter 38 from the outputs 40 of the device 29;

transmission of the instruction address code indicated in the given instruction from the output 40 of the device 29 for commutation of output signals of the matrix 27 to the input of the address register 74;

transmission of an instruction address code from the output of the register 2$_k$ to the input 78 of the address register 74.

There may be entered into the address register 74 the address code of a new instruction, which code is indicated in the instruction set in the matrix 27, or the code of the register 2$_k$ read therefrom at a specified moment of time, or an address code applied from peripheral devices to the control inputs 77 of the computer 1. The branching of the calculation program is effected by means of disjunction or conjunction of the code of the address register 74 and the new address code specified in the given instruction.

A signal, which corresponds to the synchroprogram modification code contained in the given instruction, is applied from the output of the device 29 for commutation of output signals of the program matrix 27 to the inputs 72 of the synchroprogram commutation unit 70, which provides for different modifications of synchroprograms, for example, successively performing all the microinstructions of a synchroprogram, partially performing microinstructions of a synchroprogram, and altering the sequence in which microinstructions are carried out within the limits of one synchroprogram. This makes it possible to produce new synchroprograms out of the existing synchroprogram with only insignificant expenditures in connection with the necessary equipment.

A signal, corresponding to the microinstruction modification code contained in the given instruction, is applied from the output 87 of the device 29 for commutation of output signals of the program matrix 27 to the additional control inputs of the gates 8, 7, 26, 24 and 25. This makes it possible to check the contents of the registers 2$_1$, ..., 2$_n$ without erasing information in said registers 2$_1$, ..., 2$_n$.

The proposed embodiment of a sequential computing systems comprising at least one computer 1 operates as follows.

Suppose the computer 1 is operating in the waiting mode. This mode is characterized by the fact that the information in the registers 2$_1$, ..., 2$_n$, the accumulator register 11 and the Link register 19 remains intact and by the fact that it is possible to carry out a selected program by an instruction from a peripheral device. The program of each problem to be solved by the computer 1 ends up by bringing the computer 1 into the waiting mode.

Corresponding to the waiting mode is one of the multitude of codes of the address counter 38. This mode is ensured by a specified transfer condition code contained in the instructions which correspond to the code of the address counter 38.

In this case, the counter control unit 42 applies to the address counter 38 a signal to receive the new address code indicated in the program that has been selected, as well as a signal to receive the initial address code from the peripheral device via the register 74.

The address code of a new instruction, which is produced as a result of receiving the new and/or initial address, is the address code of the instruction which is the first to be executed in the program of the problem being solved set by the peripheral device.

In the waiting mode, a new address code of an instruction must correspond to the code of the address counter 38, which corresponds to the waiting mode; this means that the same instruction of the program matrix 27 is selected prior to the arrival of the initial address from the peripheral device.

The new address code of the instruction is applied to the input 39 of the address counter 38 from the output of the device 29 for commutation of output signals of the program matrix 27; this code is entered into the address counter 38, which is done once during the operating cycle of the computer 1, by a signal from the output of the counter 35 of the controlled synchronizer.

In the waiting mode, the same microinstruction is carried out during each working step of the computer.

The duration of the working step of the computer 1 is $1/n$ of the duration of the operating cycle of said computer 1.

Control signals are applied from the respective outputs $10_1, \ldots, 10_i$ of the microinstruction matrix 10 to the gates 24, 7, 13 and 20, which initiates transmission of information in the registers $2_1, \ldots, 2_n$, the accumulator register 11 and the Link register 19. In order to provide for circulation of information in all the above-mentioned registers in the waiting mode, the synchroprogram must contain "n" identical microinstructions. FIG. 8 is a table of the location and stepwise change of information in the series connected memory registers $2_1, \ldots, 2_{36}$ in the waiting mode during one operating cycle of the computer 1 for the case when information circulates in the registers $2_1, \ldots, 2_{36}$ of three twelve-digit words $a$, $b$, $c_i$, where each word digit is designated as $a_i$, $b_i$, $c_i$ ($1 = 1, 2, \ldots, 12$). Column T (time step) lists the serial numbers of time steps; column MK (microinstruction) lists microinstruction codes (00); the columns related to the registers $2_1, \ldots, 2_{36}$ list designations of word digits circulating in said registers; each line of the table lists the contents of the registers $2_1, \ldots, 2_{36}$ recorded as a result of carrying out the microinstruction indicated in the preceding line.

FIG. 8 shows that after 36 time steps which make up one complete operating cycle of the computer 1 and after carrying out the respective microinstructions, the information contained in the registers $2_1, \ldots, 2_{36}$ is fully restored.

Consider now operation of the computer 1 in the information processing conditions. Any program carried out by the computer 1 begins with applying an initial address code of the selected program from the peripheral device to the inputs 77 (FIG. 1) of the computer 1 and then, to the inputs 76 of the address register 74.

To the input 75 of the address register 74, there is applied a signal to receive the initial address code, which code is recorded in the register 74.

In the waiting mode, which precedes the information processing mode, there is initiated a signal to receive the initial address code, so at a moment of time which coincides with the start of the operating cycle of the computer 1, the initial address code of the selected program is derived from the address register 74 and recorded in the address counter 38. According to the initial address code, the program matrix 27 selects the first instruction of the program. This instruction contains a code of a condition of a jump to the next instruction, a new address code of the instruction to be carried out during the following operating cycle of the computer 1, and the address code of a synchroprogram which determines, with due regard for the microinstruction matrix 10, the sequence of operations to be carried out, which involve the contents of the registers $2_1, \ldots, 2_n$, during the operating cycle of the computer 1. This sequence of operations is determined by a set of microinstructions which are selected in accordance with the address contained in the synchroprogram. During each time step of the computer 1, there is selected one microinstruction of the entire set of microinstructions of the computer 1, which set is stored in the microinstruction matrix 10.

Let it be assumed that while processing three twelve-digit words $a$, $b$, $c$, it is necessary to replace, by a given instruction of the program, the word $a$ by the word $b$ in the registers $2_1, \ldots, 2_{36}$ (FIG. 9).

The synchroprogram, whose address code is indicated in the given instructions, contains a sequence of microinstructions required to carry out the operation of replacing the word $a$ by the word $b$.

For the information processing mode, the sequence of microinstructions is composed, unlike in the waiting mode, of two microinstructions (00), (01). The microinstruction (01) is carried out during specified time steps of the operating cycle of the computer 1.

During the remaining time steps of the operating cycle, there is carried out the microinstruction aimed at preserving the information in the registers $2_1, \ldots, 2_{36}$.

In order to replace the word $a$ by the word $b$, the microinstruction (01) must ensure application of control signals to the gates 24, 4 and 8 (FIG. 1) at moments of time when to the inputs of these gates there are applied signals corresponding to the digits of the word $a$; the microinstruction (01) must also ensure the absence of control signals at the gates 4, 7, 15, 18, 25, 26, 50, 54, 60, 61, 68 and 94 in order to preserve the information in the registers $2_1, \ldots, 2_n$.

The signals corresponding to the digits of the word $a$ are applied from the output 3 of the register $2_n$ via the gate 24 to the input of the register $2_1$, and via the gate 4, the adder 6 and gate 8 to the input of the register $2_i$. In the present case, in the registers $2_1$ and $2_i$ there are entered the digits of the word $b$. Thus, an operation of replacement takes place in the register $2_i$, and the digits of the word $b$ replace those of the word $a$.

For greater brevity, the subsequent description of the microinstructions will only indicate the gate to whose control inputs there is applied a control signal.

FIG. 9 shows the location and stepwise alteration of information in the series connected memory registers $2_1, \ldots, 2_{36}$ when carrying out the operation of substituting the word $b$ for the word $a$. In order to carry out this operation, during steps 2, 5, 8, 11, 14, 17, 20, 23, 25, 29, 32, 35, in the course of one operating cycle of the computer 1, there are carried out the microinstructions (01) of replacing the digit of the word $a$ by the respective digit of the word $b$; during the other time steps, there are carried out the microinstructions (00) of circulation of information in the registers $2_1, \ldots, 2_{36}$.

As is seen from FIG. 9, after the second time step (see the line of step 3), in the register $2_2$ there is the first digit $b_1$ of the word $b$ instead of the first digit $a_1$ of the word $a$; after step 36 (see the line of step 37), in all the digits of the word $a$ there are the respective digits of the word $b$.

By a signal of the beginning of the next operating cycle of the computer 1, in the address counter 38 there is entered the code of a new address indicated in the preceding instruction.

Let it be assumed that the conditions of the transfer to the next instruction of the program is the presence of a signal "1" at the output 21 of the Link register 19.

The next instruction of the program contains the address code of a synchroprogram, according to which the microinstruction matrix 10 performs the following operations on the contents of the registers $2_1, \ldots, 2_{36}$:

0 is entered in the first digit $a_1$ of the word $a$;

0 is entered in the ninth digit $a_9$ of the word $a$;

0 is entered in the ninth digit $c_9$ of the word $c$;

the word $b$ is shifted one digit to the right;

the digits $a_2$ through $a_8$ of the word $a$ are shifted one digit to the left;

the tenth digit $a_{10}$ of the word $a$ is added to the eleventh digit $b_{11}$ of the word $b$; the result is assigned to the eleventh digit $c_{11}$ of the word $c$;

the twelfth digit $a_{12}$ of the word $a$ is added to the twelfth digit $b_{12}$ of the word $b$; the carry signal is recorded in the Link register 19 while performing the adding operation.

The microinstruction matrix 10 applies control signals to the respective gates, whereby the above-mentioned operations are carried out.

Suppose that by the start of the first time step (the beginning of the operating cycle of the computer 1), information in the registers $2_1, \ldots, 2_{36}$ is laid out as shown in the line of step 1 of FIG. 8.

Zero is entered in the first digit of the word $a$ and the ninth digits of the words $b$ and $c$ by applying a control signal to the input of the gate 7 (FIG. 1) during time steps 1, 25, 27 (FIG. 8).

The control signals are initiated when a corresponding microinstruction of the matrix 10 (FIG. 1) is performed. The absence within the above-mentioned time steps of a control signal across the input of the gate 24 disconnects the registers $2_{36}$ and $2_1$, so zero is entered in the first digit of the word $a$ and the ninth digits of the words $b$ and $c$.

The word $a$ is shifted one digit to the right by applying control signals to the inputs of the gates 26 and 7 (FIG. 1) during time steps 1, 4, 7, 10, 13, 16, 19, 22, 25, 28, 31, 34 (FIG. 8).

Control signals are also initiated as a corresponding microinstruction of the matrix 10 (FIG. 1) is performed.

As this takes place, the information from the output of the register $2_m$ is entered via the gate 26 into the register $2_1$; as a result, the information is shifted one digit to the right.

A shift by one digit to the left of the digits two through eight of the word $a$ is effected with the aid of the adder 6 by a number of different microinstructions. In the fourth time step, the microinstruction matrix 10 applies control signals to the inputs of the gates 4, 12 and 7, whereby the second digit of the word $a$ is transferred from the adder 6 to the accumulator register 11. In the fifth and sixth time steps, the microinstruction matrix 10 applies control signals to the inputs of the gates 7, 13 and 24, which ensures circulation of the second digit of the word $a$ in the accumulator register 11. In the seventh time step, the microinstruction matrix 10 applies control signals to the inputs of the gates 4, 7, 12 and 25, whereby the third digit of the word $a$ is replaced by the second, and the third digit of the word $a$ is entered in the accumulator register 11. The remaining digits of the word $a$ are shifted to the left in a similar manner.

The adding of the tenth digit of the word $a$ to the eleventh digit of the word $b$, the entering of the result in the eleventh digit of the word $c$, and the recording of the carry signal on the Link register 19 are performed by several microinstructions.

In the time step 23, the microinstruction matrix 10 applies control signals to the inputs of the gates 4, 7, 12 and 24 to store the tenth digit of the word $a$ in the accumulator register 11.

In the time steps 29, 30 and 31, the microinstruction matrix 10 applies control signals to the inputs of the gates 7, 13 and 24 to store the tenth digit of the word $a$ in the accumulator register 11.

In the step 32, the microinstruction matrix 10 applies control signals to the inputs of the gates 4, 7, 12, 15, 22 and 24 to add the tenth digit of the word $a$ to the eleventh digit of the word $b$ and enter the result in the accumulator register 11; simultaneously, 1 is entered in the Link register 19 if the addition results in a carry; zero is entered in the Link register 19 if there is no carry.

In the step 33, the microinstruction matrix 10 applies control signals to the inputs of the gates 7, 13 and 20, which provides for circulation of information in the accumulator register 11 and Link register 19.

In the step 34, the microinstruction matrix 10 applies control signals to the inputs of the gates 8, 15 and 24, whereby the result of the addition is tranferred from the accumulator register 11 to the eleventh digit of the word $c$, etc.

The result of the processing is applied from the output matrix 80 to the control inputs 81 of the computer 1 and proceeds to the peripheral device. As this takes place, the information from the outputs of the register $2_j$ is applied to the inputs 83 of the unit 82. As control signals are applied to the inputs 88 and 84 of said unit 82 from the outputs of the device 29 and counter 34, respectively, this information is converted into a parallel code and is applied via the commutation device 86 to the output matrix 80. The reprogrammable output matrix 80 makes it possible to modify the output code, for example, for different types of indication, as well as to send control signals to the peripheral devices (not shown).

The input of external information to the computer 1 is effected by a microinstruction, whereby there is initiated a control signal applied to the gate 68, and with the aid of the flip-flop 89 which initiates a control signal, whereby the adder 6 calculates the pulses arriving from the output 49 of the counter 33 of the controlled synchronizer.

The duration of the control signal from the flip-flop 89 is determined by the input digit; said flip-flop 89 is set and reset by output signals of the multiple-input gate 90; to inputs of said flip-flop 89 there is applied the code of the input digit, whereas applied to the input 91 of the gate 90 is an enabling signal arriving from the output of the address counter control unit 42. In many cases, especially when processing digital information represented in the computer 1 as the mantissa of a number and its exponent, the same microinstructions are used for a group of word digits, for example, to shift the whole mantissa of a number of one digit, to add the whole mantissa of a number to that of another number, etc. Such use of groups of microinstructions that are repeated within one cycle makes it possible to substantially reduce the amount of equipment (the capacity of the synchroprogram matrix), which is due to the fact that the address of only one microinstruction is indicated in the synchroprogram for this group of microinstructions. During several time steps, the control signal forming unit 36 of the controlled synchronizer produces the addresses of the same microinstructions, which provides for double-periodic synchronization of the computer 1.

As is seen from the present disclosure, a program for solving a problem comprises a sequence of synchroprograms whose addresses are stored in the program matrix 27. For a specific computer 1, synchroprograms are selected while evolving the computer's software, taking into account the versatility factor, i.e. the possibility of multiple of use synchroprograms to solve different problems.

A synchroprogram of the computer 1 accounts for the time sequence of microinstruction addresses; hence, the formation of different sequences of microinstructions is possible through the use of the same microinstructions. Thus, with a limited capacity of the microinstruction matrix 10, it is possible to produce a great number of different sequences of microinstructions (synchroprograms) required for problem solving.

In addition, the number of different synchroprograms of the computer 1 may be increased by introducing the synchroprogram commutation unit 70 which makes it possible to produce new synchroprograms out of the elements of the existing synchroprograms by providing different modifications, as has been shown above, without increasing the capacity of the matrix 30.

Thus, the computer 1 under review has a two-level programming system.

The first programming level with branching of programs and a jump to subroutines is effected with the aid of the program matrix 27, the devices 28 and 29 for commutation of input and output signals, respectively, the counter 38, and the address counter control unit 42.

The second programming level is effected with the aid of the synchroprogram matrix 30 and microinstruction matrix 10. Control signals arriving from the matrix 10 effect conversion of information in the registers $2_1, \ldots, 2_n$.

The two programming levels make it possible to combine in one instruction a number of indications as regards processing, checking, transmitting operands and results of processing, as well as the address of the next instruction, which reduces equipment costs per capacity unit of the program matrix 27.

The use in the computer 1 of the two-level programming system in combination with the proposed connections between the units of said computer 1, for example, the connections between the registers $2_1, \ldots, 2_n$, between the registers $2_1, \ldots 2_n$ and the adder, between the adder and the accumulator register 11, etc. provides for a high degree of compactness in combination with an extremely flexible system of instructions. This makes it possible to use computers intended for different purposes both to control peripheral equipment (as in the case of a minicomputer) and perform mathematical calculations (as in the case of a calculator).

The computer 1 of the proposed computing system consists in the main of the matrices 10, 30, 27 and 80, the devices 37, 32, 31, 29 and 28, and the registers $2_1, \ldots, 2_n$ and $66_1, \ldots, 66_p$. It can be inferred that the matrices 10, 30, 27 and 80, the devices 37, 32, 31, 29 and 28 for commutation of input and output signals, having a regular structure of connections, as well as series connected registers $2_1, \ldots, 2_n$ and $66_1, \ldots, 66_p$, comprising a large number of uniform elements (register digits) connected in series, all meet the requirements involved in the task of producing a computer 1 in the form of an LSI circuit.

In order to perform calculations with decimal numbers, the number of digits in the accumulator register 11 and each of the registers $2_1, \ldots, 2_n$ is selected to be equal to $4(\nu=4)$; for the purposes of correction, while adding binary-decimal numbers, there are introduced constants 0110 and 1010, the constant 1010 being applied to the input 5 of the adder 6 with aid of the AND circuit 57 if there is a signal across the inverse output of the Link register 19.

The constants 0110 and 1010 are formed by the code forming circuits 53 and 55 to whose inputs there are applied signals from the outputs of the counter 33 of the controlled synchronizer.

Besides, in order to raise the operating speed of the computer 1, several digits, for example, four digits, are processed simultaneously due to the fact that the registers $2_1, \ldots, 2_n$, all the gates, the adder 6 and the accumulator register 11 are multichannel, each channel comprising the registers $2_1, \ldots, 2_n$, the gates, the adder 6 and the accumulator register 11, all the gates being controlled simultaneously by signals applied from the output of the microinstruction matrix 10 via the gates; a carry signal is applied from the output of the adder 6 of the first channel to the input of the adder 6 of the next channel, etc., whereas a carry signal from the output of the adder 6 of the last channel is applied via the controlled gate to the input of the Link register 19.

The embodiment of the computer 1, whereas the registers $2_1, \ldots, 2_n$, the accumulator register 11, the adder 6 and all the gates are multichannel, is not shown in the drawings.

It is clear from the foregoing that in the computer 1 under review, the transfer from the sequential principle of information processing to the parallel-sequential principle is only effected through an increase in the number of channels, without any changes in the other units.

In case of an increase in the range of problems to be solved, the computers 1 are combined into a computing system comprising several computers which are synchronized by signals applied from the output 48 of one of the computers 1 to the inputs 46 of the rest of the computers 1; exchange of information is carried out through the registers $66_1, \ldots, 66_p$. The computers 1 incorporated in the computing system can operate both simultaneously and one after another.

Consider now a computing system composed of three computers 1, 1' and 1''. Apart from said computers 1, 1' and 1'', the system includes the external registers $95_1, \ldots, 95_q$ and the buffer device 96.

The connection of the computers 1, 1' and 1'', the registers $95_1, \ldots, 95_q$ and the buffer device 96 is shown in FIG. 2.

Each of the computers 1, 1' and 1'' operates as the one described above.

The registers $66_1, \ldots, 66_p$ of all the computers 1, 1' and 1'', the gate 67, the external registers $95_1, \ldots, 95_q$ and the buffer device 96 are all placed in series and form a single closed circuit.

A jump to calculations according to a program recorded in the computer 1' is performed with the aid of said closed circuit.

Let it be assumed that the first computer 1 has finished calculations according to its program, and that it is necessary to continue calculations according to a program of the third computer 1''. For this purpose, the first computer 1 forms and enters into the closed circuit, via the gate 64 of the first computer 1, the number code of the computer which is to continue calculations (in the present case, this is the third computer 1''). Apart from the code number of the computer 1'', the first computer 1 enters into the closed circuit the initial address of the program according to which the third computer 1'' is to continue calculations; if necessary, the computer 1 enters the intermediary results of its own calculations.

The information entered into said closed circuit circulates in this circuit, i.e. it successively passes through all the computers 1, 1' and 1''.

In order to enable any computer of the system to continue calculations, it is necessary that all the computers 1, 1' and 1" of the computing system should be capable of interruption. In the course of an interruption, there is carried out the checking of the contents of the closed circuit and established the number code of the computer 1, which coincides with the number of code previously assigned to said computer 1. In case of simultaneous operation of all the computers 1, 1' and 1" of the computing system, the interruption program is inserted at specified points in the calculation program; if the computers 1, 1' and 1" operate sequentially, all the calculation programs of each of the computers 1, 1' and 1" are to end with an interruption program which is matched, if necessary, with the waiting mode.

If in the course of an interruption, the computer 1 finds its number code in the closed circuit, said computer 1 transfers the initial address code from the closed circuit to its registers $2_1, \ldots, 2_n$, from the output of the register $2_k$ to the address counter 38 to continue calculations according to the program selected according to the given initial address.

Consider now a programmable computing system, wherein one of the computers 1 is programmed as a computer 1 which controls all the other computers of the system.

Such a computing system is programmed at the level of programs of the controlled computers 1 by presetting the initial address codes of these programs in the control program. The control program is entered into the closed circuit via the gate 64 of the control computer 1 from the peripheral device. The control computer 1 selects the initial address codes of the required programs from the control program and turns over the control of the calculation process to the controlled computers 1 containing these programs. After the controlled computer 1 has finished a certain program, there is a comeback to the control program in order to determine the next initial address code with the aid of the control computer 1 and continue calculations.

The proposed output buffer device 96 (FIG. 4) operates as follows. During the action of the clock pulse 159 (FIG. 6a) applied to the second clock pulse bus 108 (FIG. 4), the transistor 113 is driven into conduction, so that information, which has been applied to the input 112 of the buffer device 96, is sent to the input 122 of the follower 102. Simultaneously, the input information is applied via the inverter 111 to the input 105 of the follower 101. If in the course of the duration of the clock pulse 159 (FIG. 6a) there is applied high voltage to the input 112 (FIG. 4) of the buffer device 96, at the input 105 of the follower 101 there is low voltage, and the positive feedback capacitor 110 discharges through the output resistor of the inverter 111 and the transistor 107 (FIG. 4) which is conducting during the action of the clock pulse 150 (FIG. 6a). At the output 106 of the follower 101, there is set low voltage. The positive feedback capacitor 110 remains discharged until the arrival of the next pulse 160 (FIG. 6a) at the second clock pulse bus 108 (FIG. 4); the transistor 103 remains non-conducting, and low voltage is maintained across the output 106 of the follower 101. If during the action of the clock pulse 159 (FIG. 6a) there is applied low voltage to the input 112 (FIG. 4) of the buffer device 96, there is observed high voltage across the input 105 of the follower 101, and the positive feedback capacitor 110 is charged through the output resistor of the inverter 111 and the transistor 107 (FIG. 4) which is in the conducting state during the action of the clock pulse 159 (FIG. 6a). There is now high voltage at the output 106 of the follower 101. The positive feedback capacitor 110 remains charged until the arrival of the next pulse 160 (FIG. 6a) at the second clock pulse bus 108 (FIG. 4), whereby the transistor 103 is maintained in the state of conduction. As a result, the clock pulse 161 (FIG. 6b), which is applied to the first clock pulse bus 104 (FIG. 4) via the transistor 103, passes to the output 106 of the follower 101. If during the action of the clock pulse 159 (FIG. 6a) high voltage is applied to the input 112 (FIG. 4) of the buffer device 96, there is high voltage across the input 122 of the follower 102, and the clock pulse 161 (FIG. 6b) is applied to the output 118 (FIG. 4) of the follower 102, because the circuitry of the follower 102 is similar to that of the follower 101. If during the action of the clock pulse 159 (FIG. 6a) there is applied low voltage to the input 112 (FIG. 4) of the buffer device 96, there is low voltage across the input 122 of the follower 102, and low voltage is maintained across the output 118. Each of the positive feedback capacitors 110 serves for maximum transmission of the voltage of the clock pulses 161 and 162 (FIG. 6b) to the outputs 106 and 118 (FIG. 4), since the voltage of the charged positive feedback capacitor 110 is added at the gate of the transistor 103 to the source voltage of the transistor 103, whereby the transistor 103 is driven into conduction more effectively during the action of the clock pulses 161 and 162 (FIG. 6b). Thus, if low voltage is applied to the input 112 (FIG. 4) of the buffer device 96, the transistor 114 is driven into conduction by the clock pulse 161 (FIG. 6b) applied from the output 106 (FIG. 4) of the follower 101, so that high voltage is applied from the first supply bus 115 to the common point 116 and the gates of the transistors 119 and 126. The transistors 119 and 126 are snapped into conduction. The conducting transistor 119 passes low voltage of the common bus 109 to the common point 120 and the gate of the transistor 123. The transistor 123 is rendered non-conducting, and the output 125 of the buffer device 96 gets connected to the common bus 109 via the conducting transistor 126. The transistors 121 and 117 are rendered non-conducting by low voltage across the input 122 and the output 118 of the follower 102.

Figure 4:
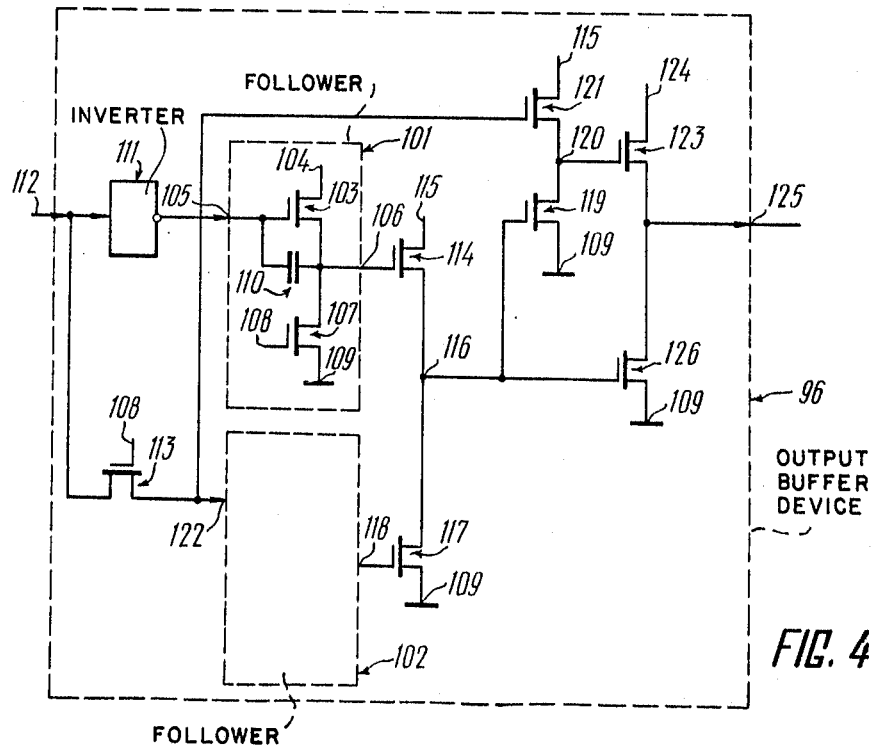
FIG. 4 is an electrical diagram of an output buffer device of an external register of a sequential computer, in accordance with the invention.

If high voltage is applied to the input 112 of the buffer device 96, the transistor 117 is driven into conduction by the clock pulse 161 (FIG. 6b) applied from the output 118 (FIG. 4) of the follower 102, so that low voltage is applied from the common bus 109 to the common point 116 and the gates of the transistors 119 and 126. The transistors 119 and 126 are rendered non-conducting. The transistor 114 is rendered non-conducting by low voltage at the output 106 of the follower 101. The transistor 121 is driven into conduction by high voltage at the input 122 of the follower 102, so that high voltage of the first supply bus 115 is applied to the common point 120 and the gate of the transistor 123. The transistor 123 is driven into conduction, and high voltage is applied from the second supply bus 124 to the output 125 of the buffer device 96. The state of the output 125 of the buffer device 96 remains unchanged until the arrival of the next clock pulse 162 (FIG. 6b) applied to the first clock pulse bus 104 (FIG. 4), because the transistors 114 and 117 are non-conducting during the period of time between the clock pulses 161 and 162 (FIG. 6b), so that information is maintained at the capacitances of the gates of the transistors 119 and 126 (FIG. 4).

The proposed devices 28 and 29 (FIG. 5) for commutation of input and output signals of the matrix 27 operate as follows. During the action of the clock pulse 163 (FIG. 7a) applied to the second clock pulse bus 137 (FIG. 5), the transistor 135 is driven into conduction, and information is applied to the gate of the transistor 138. Simultaneously, the switchable capacitor 146 is charged through the transistor 143 which has been driven into conduction by the clock pulse 163 (FIG. 7a). The transistor 144 is snapped into conduction, and low voltage is applied to the output 145 of the second exciting circuit 132 of the decoder 127. If high voltage is applied to the address input 136 of the commutation device 28, the positive feedback capacitor 141 is charged through the conducting transistors 135 and 138 to the third clock pulse bus 139 at which there is low voltage during the action of the clock pulse 163 (FIG. 7a). Upon the end of the action of the clock pulse 163 and prior to the arrival of the clock pulse 165 (FIG. 7b), the switchable capacitor 146 (FIG. 5) discharges through the conducting transistor 142. During the action of the clock pulse 166 (FIG. 7b) applied to the third clock pulse bus 139 (FIG. 5), the clock pulse 166 (FIG. 7b) is transmitted via the conducting transistor 138 (FIG. 5) to the output 140 of the first exciting circuit 131 of the decoder 127. As this takes place, low voltage is maintained across the output 145 of the second exciting circuit 132 of the decoder 127, since the transistors 144 remains non-conducting. If low voltage is applied to the address input 136 of the commutation device 26, the positive feedback capacitor 141 discharges, the transistor 142 is non-conducting, and high voltage is maintained at the gate of the transistor 144. During the action of the clock pulse 166 (FIG. 7b), the clock pulse 166 is transmitted via the conducting transistor 144 (FIG. 5) to the output 145 of the second exciting circuit 132 of the decoder 127. As this takes place, low voltage is maintained across the output 140 of the first exciting circuit 131 of the decoder 127, since the transistor 138 remains non-conducting.

The positive feedback capacitor 141 serves to more fully transmit the voltage of the clock pulses 166, 167 and 168 (FIG. 7b) and increase the load capacity of the output 140 (FIG. 5) of the first exciting circuits 131 of the decoder 127, because the voltage of the charged positive feedback capacitor 141 is added at the gate of the transistor 138 to the drain voltage of the transistor 138, whereby the transistor 138 is driven into conduction more effectively during the action of the clock pulses 166, 167 and 168 (FIG. 7b).

The switchable capacitor 146 (FIG. 5) also serves to more fully transmit the voltage of the clock pulses 166, 167 and 168 (FIG. 7b) and raise the load capacity of the output 145 (FIG. 5) of the second exciting circuits 132 of the decoder 127, because the voltage of the charged switchable capacitor 146 is added at the gate of the transistor 144 to the voltage of the clock pulses 166, 167 and 168 (FIG. 7b), whereby the transistor 144 (FIG. 5) is driven into conduction more effectively during the action of the clock pulses 166, 167 and 168 (FIG. 7b). The capacity of the discharged switchable capacitor 146 (FIG. 5) is at a minimum, so the voltage of the clock pulses 166, 167 and 168 (FIG. 7b) is not transmitted to the gate of the transistor 144 (FIG. 5) during the action of these pulses.

Hence, information applied to the address inputs 136 of the commutation device 28 during the action of clock pulses at the third clock pulse bus 139 is transmitted in the direct form to the outputs 140 of the first exciting circuits 131 of the decoder 127, and in the inverted form, to the outputs 145 of the second exciting circuits 132 of the decoder 127. During the periods of time between adjacent clock pulses applied to the third clock pulse bus 139, there is low voltage at the outputs 140 and 145 of the first and second exciting circuits 131 and 132, respectively, of the decoder 127.

During the action of the clock pulse 169 (FIG. 7c) applied to the first bus 147 (FIG. 5), the commutation devices 28 and 29 are prepared for subsequent operation. Low voltage is set at the common input 128 of the decoder 127. The capacitances of the internal units of the decoder 127 are discharged through the output resistor of the inverter 134 and the conducting transistors 148 of the discharge device 133. The capacitances of the output 129 of the decoder 127 are discharged through the same circuit, including the selected output, because at the address inputs 130 of the decoder 127 there is found the information applied from the outputs 140 and 145 of the first and second exciting circuits 131 and 132, respectively, of the decoder 127 during the action of the clock pulse 166 (FIG. 7b). Simultaneously, the capacitances of the inputs 152 of the decoder 151 and the capacitances of the outputs 153 of the decoder 151 are charged through the conducting transistors 156 of the charger 155 from the supply bus 158, because at the address inputs 154 of the decoder 151 there is information applied from the outputs 140 and 145 of the first and second exciting circuits 131 and 132, respectively, of the decoder 151 during the action of the clock pulse 166 (FIG. 7b).

Upon the end of the action of the clock pulse 169 (FIG. 7c) and during the action of the clock pulse 166 (FIG. 7b), high voltage is set across the input 128 (FIG. 5) of the decoder 127, which high voltage is applied to one of the outputs 129 of the decoder 127. The matrix 27 selects the information, and the output information of the matrix 27, which is applied to specified outputs of the matrix 27 as low voltage, is transmitted to the outputs 153 of the decoder 151 and, accordingly, to the outputs of the device 29 for commutation of output signals of the matrix 27.

In the period between the clock pulses 166 and 167 (FIG. 7b), there is applied low voltage to the inputs 130 and 154 (FIG. 5) of the decoders 127 and 151, and upon the end of the clock pulse 169 (FIG. 7c) and during the action of the clock pulse 166 (FIG. 7b), the information applied to the outputs of the device 29 for commutation of output signals of the matrix 27 is maintained at the output capacitance of these outputs until the arrival of the following clock pulses 170 (FIG. 7c) and 167 (FIG. 7b).

The commutation devices 28 and 29 of the matrix 27 operate in a similar way during the action of the pulses 164, 165 (FIG. 7a), 167, 168 (FIG. 7b), and 170, 171 (FIG. 7c).

The proposed sequential computing system makes it possible to use the computer 1 as the basis for different computing systems which may include one computer 1 to solve simple problems, or several computers 1 to solve complicated mathematical problems, problems of management and problems involved in developing programmable systems.

In such computing systems, the computers 1 only differ in the type of threading of the matrices 10, 30, 27 and 80 (i.e. in the software). If a computer 1 is based on an LSI circuit, it is enough to replace one masking element (mask) to provide computers for different purposes.

What is claimed is:

1. A sequential computing system consisting of at least one sequential computer which comprises:
   an adder for information processing having a first, a second and a third input, and a first and a second output;
   a first, a second, a third, a fourth, a fifth, a sixth, a seventh, an eighth, a ninth, a tenth, an eleventh and a twelfth gate, each of which has a control input, said control inputs being connected together;
   at least one accumulator register having an input, a direct output and an inverse output, said input of said accumulator register being connected via said fourth gate to said first output of said adder and via said fifth gate to its own direct output, said direct output of said accumulator register being connected via said sixth gate to said second input of said adder, and said inverse output of said accumulator register being connected via said seventh gate to said second input of said adder;
   series connected registers which are the main memory of the computer, each of said memory registers having a direct output and an input, said direct output of a last in order of said series connected memory registers being connected via said first gate to said first input of said adder, said input of at least one register of said series connected memory registers being connected via said second gate to said output of the preceding register of said series connected memory registers and via said third gate to said first output of said adder, said input of the first register of said series connected memory registers being connected via said tenth gate to said direct output of the last in order register of said series connected memory registers, via said eleventh gate to said direct output of said accumulator register, and via said twelfth gate to said output of at least one more of said series connected memory registers;
   at least one single digit Link register for carry storage having an input, a direct output and an inverse output, said input of said Link register being connected via said eighth gate to its own direct output and via said ninth gate to said second output of said adder;
   a program matrix having inputs and outputs;
   a device for commutation of input signals of said program matrix having inputs and outputs, said inputs of said program matrix being connected to said outputs of said device for commutation of input signals of said program matrix;
   a device for commutation of output signals of said program matrix having inputs, a first set, a second set, a third set and a fourth set of outputs, and an output, said outputs of said program matrix being connected to said inputs of said device for commutation of output signals of said program matrix;
   a synchroprogram matrix having inputs and outputs;
   an output decoder of said synchroprogram matrix having a first and a second set of inputs and outputs, said outputs of said synchroprogram matrix being connected to said first set of inputs of said output decoder;
   a device for commutation of input signals of said synchroprogram matrix having a first set and a second set of inputs and outputs, said inputs of said synchroprogram matrix being connected to said outputs of said device for commutation of input signals of said synchroprogram matrix, said first set of inputs of said device for commutation of input signals of said synchroprogram matrix being connected to said third set of outputs of said device for commutation of output signals of said program matrix;
   a microinstruction matrix to control said gates having inputs and outputs, said outputs being connected to said control inputs of each of said gates;
   a device for commutation of input signals of said microinstruction matrix having inputs and outputs, said inputs of said device for commutation of input signals of said microinstruction matrix being connected to said outputs of said output decoder, said outputs of said device for commutation of input signals of said microinstruction matrix being connected to said inputs of said microinstruction matrix;
   a controlled synchronizer for double periodic synchronization having at least three series connected counters to initiate time separated clock signals, said first counter having an input, a set of outputs, a first and a second output, said second counter having an input, a set of outputs, a first and a second output, said third counter having an input, a first and a second set of outputs, and a first and a second output, said input of said first counter being connected to a synchronization input of said computer, said first set of outputs and said second output of said third counter being connected to synchronization outputs of said computer, said input of said second counter being connected to said second output of said first counter, said input of said third counter being connected to said second output of said second counter, and at least one control signal forming unit having inputs and outputs, said inputs of said control signal forming unit being connected to said second set of outputs of said third counter, the second set of inputs of said device for commutation of input signals of said synchroprogram matrix being connected to said set of outputs of said second counter, said second set of inputs of said output decoder being electrically coupled to said outputs of said control signal forming unit to provide for a sequence of microinstructions;
   an address counter having a first, a second, and a third set of inputs, and outputs, said outputs of said address counter being connected to said inputs of said device for commutation of input signals of said program matrix, said first set of inputs of said address counter being connected to said first set of outputs of said device for commutation of output signals of said program matrix;
   an address counter control unit having a first, a second and a third input, a set of inputs, a set of outputs, and a first and a second output, said second set of inputs of said address counter being connected to said set of outputs of said address counter control unit, said set of inputs of said address counter control unit being connected to said second set of outputs of said device for commutation of output signals of said program matrix, the second input of said address counter control unit being connected to said first output of said third counter, said first input of said address counter control unit being connected to said direct output of said single digit Link register.

2. A sequential computing system as claimed in claim 1, wherein said at least one computer further comprises:
a synchroprogram commutation unit to change the sequence of microinstructions, which sequence is set by said synchroprogram matrix, having a first and a second set of inputs and outputs, said second set of inputs of said output decoder being connected to said outputs of said synchroprogram commutation unit and said first set of inputs of said synchroprogram commutation unit being connected to said outputs of said control signal unit, such that said output decoder is electrically coupled via said synchroprogram commutation unit to said control signal forming unit, the second set of inputs of said synchroprogram commutation unit being connected to said fourth set of outputs of said device for commutation of output signals of said program matrix.

3. A sequential computing system as claimed in claim 1, wherein said at least one computer further comprises:
an output matrix for output of information having inputs and outputs, said outputs of said output matrix being connected to control outputs of said computer;
a device for commutation of input signals of said output matrix having inputs and outputs, said outputs of said device for commutation of input signals of said output matrix being connected to said inputs of said output matrix;
a code conversion unit having a set of inputs, a first and a second input and outputs, said set of inputs of said code conversion unit being connected to one of said series connected memory registers, said first input of said code conversion unit being connected to said first output of the second counter, said second input of said code conversion unit being connected to said output of said device for commutation of output signals of said program matrix, said outputs of said code conversion unit being connected to said inputs of said device for commutation of input signals of said output matrix.

4. A sequential computing system as claimed in claim 1, wherein said second, third, tenth, eleventh and twelfth gates have a second control input, which is connected to said output of said device for commutation of output signals of said program matrix.

5. A sequential computing system as claimed in claim 1, to perform decimal arithmetic operations and form constants, further comprising:
a thirteenth, a fourteenth, a fifteenth, a sixteenth, a seventeen, an eighteenth and a nineteenth gate, each of said gates having a control input connected to said output of said microinstruction matrix, the direct output of said last in order of said series connected memory registers being connected via said thirteenth gate to said second input of said adder, an inverse output of said last in order of said series connected memory registers being connected via said sixteenth gate to said first input of said adder, the direct output of said Link register being connected via said seventeenth gate to said third input of said adder, said first output of said first counter being connected via said nineteenth gate to said third input of said adder;
an AND circuit having a first and a second input and an output, said second input being connected to said inverse output of said Link register, said output being connected via said fifteenth gate to said first input of said adder;
a first and a second OR circuit, each having inputs and an output, said output of said second OR circuit being connected to said first input of said AND circuit, said output of said first OR circuit being connected via said fourteenth gate to said second input of said adder, said inputs of said first and said second OR circuit being connected to said set of outputs of said first counter.

6. A sequential computing system as claimed in claim 1, wherein said at least one sequential computer further comprises:
an address register to produce complicated branching of a program having a first and a second set of inputs, a first and a second input, and a set of outputs, said first set of inputs of said address register being connected to said first set of outputs of said device for commutation of output signals of said program matrix, said first input of said address register being connected to said first output of said address counter control unit, said second set of inputs of said address register being connected to control inputs of said computer, said second input of said address register being connected to said output of one of said series connected memory registers, said outputs of said address register being connected to said third set of inputs of said address counter.

7. A sequential computing system as claimed in claim 6, wherein said at least one computer further comprises:
a multiple input gate having a set of inputs, an input and an output, said set of inputs being connected to said control inputs of said computer, said input being connected to said second output of said address counter control unit;
a flip-flop to enter digital information from peripheral devices in said computer having an input and an output, said input of said flip-flop being connected to said output of said multiple input gate, said output of said flip-flop being connected to said third input of said address counter control unit and via an eighteenth gate to said third input of said adder, said eighteenth gate having a control input connected to said outputs of said microinstruction matrix.

8. A sequential computing system as claimed in claim 6, wherein in said at least one said computer, said series connected memory registers and said accumulator register are four digit shift registers, and all of said gates and said adder are single channel;
said first counter of said controlled synchronizer being used to determine the time required to process four bits of information.

9. A sequential computing system as claimed in claim 6, wherein in said at least one said computer, said accumulator register and said series connected memory registers are multichannel shift registers;
said adder is multichannel;
all of said gates are multichannel;
said control inputs of said multichannel gates being combined and connected to said outputs of said microinstruction matrix.

10. A sequential computing system as claimed in claim 6, wherein said at least one said computer further comprises:

a thirteenth gate placed between said direct output of the last in order register of said series connected memory registers and said second input of said adder, said thirteenth gate having a control input connected to said outputs of said microinstruction matrix.

11. A sequential computing system as claimed in claim 1, wherein said at least one computer further comprises:
   a twentieth gate to connect said direct output of said accumulator register to an output of said computer having a control input connected to said outputs of said microinstruction matrix;
   additional series connected registers to augment the main memory of said computer having inputs and outputs, said output of a last in order register of said additional series connected registers being connected via a twenty-first gate to said output of said computer and via a twenty-second gate to said first input of said adder, said twenty-first and said twenty-second gate having a control input connected to said outputs of said microinstruction matrix, said input of a first register of said additional series connected registers being connected to an input of said computer.

12. A sequential computing system as claimed in claim 1, wherein sequential computers are connected as follows:
   an input of each computer is connected to an output of the next in order computer, an input of a last in order computer is connected to an output of a first in order computer, said synchronization output of said first in order computer being connected to said synchronization inputs of all the following computers.

13. A sequential computer system as claimed in claim 12, further comprising:
   at least one external shift register having an input connected to said output of said first in order computer;
   at least one external shift register having an output buffer device to connect said external shift register to said computing system, said output buffer device being connected to said input of said last in order computer.

14. A sequential computing system as claimed in claim 13, wherein the output buffer device comprises:
   two followers having an input and an output, each of said followers consisting of a first FET transistor having a drain, a source and a gate, a second FET transistor having a drain, a source and a gate, and a positive feedback capacitor;
   a first and a second clock pulse bus;
   a common bus;
   a first and a second supply bus;
   a third FET transistor having a drain, a source and a gate;
   a fourth FET transistor having a drain, a source and a gate;
   a fifth FET transistor having a drain, a source and a gate;
   a sixth FET transistor having a drain, a source and a gate;
   a seventh FET transistor having a drain, a source and a gate;
   an eighth FET transistor having a drain, a source and a gate;
   a ninth FET transistor having a drain, a source and a gate;
   an inverter having an input and an output;
   wherein said drain of said first FET transistor being connected to said first clock pulse bus, said gate of said first FET transistor being connected to said input of its respective follower, said source of said first FET transistor being connected to said output of its respective follower and said drain of said second FET transistor, said gate of said second FET transistor being connected to said second clock pulse bus, said source of said second FET transistor being connected to said common bus, said positive feedback capacitor being placed between said gate and said source of said first FET transistor, said input of said first follower being connected to said output of said inverter, said input of said inverter being connected to said input of said buffer device and said drain of said third FET transistor, said gate of said third FET transistor being connected to said second clock pulse bus, said output of said first follower being connected to said gate of said fourth FET transistor, said drain of said fourth FET transistor being connected to said first supply bus, said source of said fourth FET transistor being combined into a first common point with said drain of said fifth FET transistor, said gate of said sixth FET transistor and said gate of said ninth FET transistor, said source of said fifth FET transistor being connected to said common bus, said gate of said fifth FET transistor being connected to said output of said second follower, said source of said sixth FET transistor being connected to said common bus, said drain of said sixth FET transistor being combined into a second common point with said source of said seventh FET transistor and with said gate of said eighth FET transistor, said drain of said seventh FET transistor being connected to said first supply bus, said gate of said seventh FET transistor being combined with said source of said third FET transistor and said input of said second follower, said drain of said eighth FET transistor being connected to said second supply bus, said source of said eighth FET transistor being combined with said output of said buffer device and said drain of said ninth FET transistor, said source of said ninth FET transistor being connected to said common bus.

15. A sequential computing system as claimed in claim 1, wherein in said at least one of said computers said address counter comprises:
   a system of series connected flip-flops, outputs of said flip-flops being the outputs of said address counter;
   a first set of gates interconnecting said system of series connected flip-flops;
   an inverter having an input and an output, said input of said inverter being connected to said output of a next to last in order flip-flop, said output of said inverter being connected via a first gate to an input of a first in order flip-flop;
   a second set of gates interconnecting inputs of said flip-flops to said first set of inputs of said address counter;
   a third set of gates interconnecting said inputs of said flip-flops to said third set of inputs of said address counter;

control inputs of said gates of each of said sets of gates and of said first gate being connected to said second set of inputs of said address counter.

16. A sequential computing system as claimed in claim 1, wherein in said at least one computer, each of said devices for commutation of input signals of said program matrix, said synchroprogram matrix and said microinstruction matrix comprises:

a first, a second and a third clock pulse bus;
an address signal bus;
a common bus;
a decoder having a common input, address inputs, and outputs, said decoder providing conduction between said common input and one of said outputs of said decoder, depending upon which code has been applied to said address inputs of said decoder;
a discharge device having inputs and outputs, said discharge device consisting of FET transistors having drains, sources and gates, said drains of said FET transistors being connected to said inputs of said discharge device, said gates of said FET transistors being connected to said first clock pulse bus, said sources of said FET transistors being connected to said common bus, said inputs of said discharge device being connected to said outputs of said decoder and said inputs of said respective matrix;
an inverter having an input and an output, said output of said inverter being connected to said common input of said decoder, said input of said inverter being connected to said first clock pulse bus;
first and second exciting circuits having an input and an output, said output of each of said exciting circuits being connected to the respective address input of said decoder, each of said first exciting circuits of said decoder consisting of a positive feedback capacitor, a first FET transistor having a drain, a source and a gate, a second FET transistor having a drain, a source and a gate, said drain of said first FET transistor being connected to said address signal bus and serving as said input of said first exciting circuit, said gate of said first FET transistor being connected to said second clock pulse bus, said source of said first FET transistor being connected to said gate of said second FET transistor, said source of said second FET transistor being connected to said third clock pulse bus, said drain of said second FET transistor being connected to said output of said first exciting circuit, said positive feedback capacitor being placed between said drain and said gate of said second FET transistor, each of said second exciting circuits of said decoder consisting of a third FET transistor having a drain, a source and a gate, a fourth FET transistor having a drain, a source and a gate, a fifth FET transistor having a drain, a source and a gate, a switchable capacitor having an electrode and a control electrode, said source of said third FET transistor being connected to said second clock pulse bus, said gate of said third FET transistor being connected to said address signal bus and serving as said input of said second exciting circuit, said drain of said third FET transistor being connected to said source of said fourth FET transistor and said gate of said fifth FET transistor, said gate and said drain of said fourth FET transistor being connected to said second clock pulse bus, said drain of said fifth FET transistor being connected to said output of said second exciting circuit, said source of said fifth FET transistor being connected to said third clock pulse bus, said switchable capacitor being placed between said source and said gate of said fifth FET transistor, said control electrode of said swithchable capacitor being connected to said gate of said fifth FET transistor, said electrode of said switchable capacitor being connected to said source of said fifth FET transistor.

17. A sequential computing system as claimed in claim 1, wherein in said at least one computer, the device for commutation of output signals of the program matrix comprises:

a decoder having inputs, address inputs and outputs, said decoder providing conduction between said inputs and said outputs, depending upon which code has been applied to said address inputs of said decoder;
an address bus;
a first, a second and a third clock pulse bus;
a supply bus;
a charger having inputs and outputs, said charger consisting of FET transistors having drains, sources and gates, said sources of said FET transistors being connected to said outputs of said charger, said gates of said FET transistors being connected to said first clock pulse bus, said drains of said FET transistors being connected to said supply bus, said outputs of said charger being connected to said inputs of said decoder and said outputs of said program matrix;
first and second exciting circuits of said decoder having an input and an output, said output of each exciting circuits being connected to said respective address input of said decoder, each of said first exciting circuits consisting of a first FET transistor having a drain, a source and a gate, a second FET transistor having a drain, a source and a gate, a positive feedback capacitor, said drain of said first FET transistor being connected to a said address signal bus and serving as said input of said first exciting circuit, said gate of said first FET transistor being connected to said second clock pulse bus, said source of said first FET transistor being connected to said gate of said second FET transistor, said source of said second FET transistor being connected to said third clock pulse bus, said drain of said second FET transistor being connected to said output of said exciting circuit, said positive feedback capacitor being placed between said drain and said gate of said second FET transistor, each of said second exciting circuits of said decoder consisting of a third FET transistor having a drain, a source and a gate, a fourth FET transistor having a drain, a source and a gate, a fifth FET transistor having a drain, a source and a gate, a switchable capacitor having a control electrode and an electrode, said source of said third FET transistor being connected to said second clock pulse bus, said gate of said third transistor being connected to said address signal bus and serving as said input of said second exciting circuit, said drain of said third FET transistor being connected to said source of said fourth FET transistor and said gate of said fifth FET transistor, said gate and said drain of said fourth FET transistor being connected to said second clock pulse bus, said drain of said fifth FET transistor being connected to said output of said second exciting circuit, said source of said fifth FET transistor being connected to said third clock pulse bus, said switchable capacitor being placed between said source and said gate of said fifth FET transistor, said control electrode of said switchable capacitor being connected to said gate of said fifth FET transistor, said other electrode of said switchable capacitor being connected to said source of said fifth FET transistor.

18. A sequential computing system as claimed in claim 1, wherein each of said computers is built on one semiconductor substrate.

* * * * *